(12) United States Patent
Matz et al.

(10) Patent No.: US 8,086,491 B1
(45) Date of Patent: Dec. 27, 2011

(54) METHOD AND SYSTEM FOR TARGETED CONTENT DISTRIBUTION USING TAGGED DATA STREAMS

(75) Inventors: William R. Matz, Atlanta, GA (US); Scott R. Swix, Duluth, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 1277 days.

(21) Appl. No.: 10/039,062

(22) Filed: Dec. 31, 2001

(51) Int. Cl.
*G06F 15/16* (2006.01)
*G06Q 30/00* (2006.01)

(52) U.S. Cl. ............... 705/14.66; 705/14.49; 709/217; 725/34

(58) Field of Classification Search .......... 709/217; 705/14, 14.4, 14.49, 14.51, 14.53, 14.66; 725/32, 34, 35
See application file for complete search history.

(56) References Cited

U.S. PATENT DOCUMENTS

| | | | |
|---|---|---|---|
| 677,209 A * | 6/1901 | Chernock at al. | ............. 423/630 |
| 3,798,610 A | 3/1974 | Bliss et al. | |
| 3,886,302 A | 5/1975 | Kosco | |
| 4,130,833 A | 12/1978 | Chomet | |
| 4,258,386 A | 3/1981 | Cheung | |
| 4,361,851 A | 11/1982 | Asip et al. | |
| 4,488,179 A | 12/1984 | Kruger et al. | |
| 4,566,030 A | 1/1986 | Nickerson et al. | |
| 4,567,591 A | 1/1986 | Gray et al. | |
| 4,598,288 A | 7/1986 | Yarbrough et al. | |
| 4,602,279 A | 7/1986 | Freeman | |
| 4,688,248 A | 8/1987 | Tomizawa | |
| 4,689,661 A | 8/1987 | Barbieri et al. | |
| 4,697,209 A | 9/1987 | Kiewit et al. | |
| 4,698,670 A | 10/1987 | Matty | |
| 4,720,873 A | 1/1988 | Goodman et al. | |
| 4,816,904 A | 3/1989 | McKenna et al. | |
| 4,885,632 A | 12/1989 | Mabey et al. | |
| 4,890,322 A | 12/1989 | Russell, Jr. | |
| 4,912,552 A | 3/1990 | Allison. | |
| 5,010,585 A | 4/1991 | Garcia | |
| 5,038,211 A * | 8/1991 | Hallenbeck | .................. 348/460 |
| 5,046,090 A | 9/1991 | Walker et al. | |
| 5,046,092 A | 9/1991 | Walker et al. | |

(Continued)

FOREIGN PATENT DOCUMENTS

EP       0 424 648       2/1991

(Continued)

OTHER PUBLICATIONS

"The Wink System,", www.wink.com, date unknown, 5 pages.

(Continued)

*Primary Examiner* — Aaron Strange
(74) *Attorney, Agent, or Firm* — Scott P. Zimmerman PLLC

(57) ABSTRACT

A method for targeting content to a user based on a user profile and content tags. All content is delivered to the user's computer system. Each unit of content has a tag uniquely identifying a classification of the content. The receiving computer recognizes and evaluates the tags to match the content with a local user profile. The matching content is selected from all the content and displayed. The user profile is a set of data describing the classifications of content that are most appropriate for the user. The profile can be developed based on usage history or demographic information. The user computer system has a tag dictionary that may be updated to correspond to a set of tags utilized by content delivery systems.

18 Claims, 12 Drawing Sheets

U.S. PATENT DOCUMENTS

| | | | |
|---|---|---|---|
| 5,055,924 A | 10/1991 | Skutta | |
| 5,173,900 A | 12/1992 | Miller et al. | |
| 5,191,645 A | 3/1993 | Carlucci et al. | |
| 5,208,665 A | 5/1993 | McCalley et al. | |
| 5,247,347 A | 9/1993 | Litteral et al. | |
| 5,249,044 A | 9/1993 | Von Kohorn | |
| 5,251,324 A | 10/1993 | McMullan | |
| 5,287,181 A | 2/1994 | Holman | |
| 5,335,277 A | 8/1994 | Harvey et al. | |
| 5,339,315 A | 8/1994 | Maeda et al. | |
| 5,343,240 A | 8/1994 | Yu | |
| 5,357,276 A | 10/1994 | Banker et al. | |
| 5,374,951 A | 12/1994 | Welsh | |
| 5,382,970 A | 1/1995 | Kiefl | |
| 5,389,964 A | 2/1995 | Oberle et al. | |
| 5,404,393 A | 4/1995 | Remillard | |
| 5,410,326 A | 4/1995 | Goldstein | |
| 5,410,344 A | 4/1995 | Graves et al. | |
| 5,436,653 A | 7/1995 | Ellis et al. | |
| 5,440,334 A * | 8/1995 | Walters et al. | 725/92 |
| 5,444,499 A | 8/1995 | Saitoh | |
| 5,446,490 A | 8/1995 | Blahut et al. | |
| 5,446,919 A | 8/1995 | Wilkins | |
| 5,481,294 A | 1/1996 | Thomas et al. | |
| 5,497,185 A | 3/1996 | Dufresne et al. | |
| 5,500,681 A | 3/1996 | Jones | |
| 5,504,519 A | 4/1996 | Remillard | |
| 5,532,732 A | 7/1996 | Yuen et al. | |
| 5,532,735 A | 7/1996 | Blahut et al. | |
| 5,534,911 A | 7/1996 | Levitan | |
| 5,537,143 A | 7/1996 | Steingold et al. | |
| 5,543,911 A | 8/1996 | Levitan | |
| 5,559,548 A * | 9/1996 | Davis et al. | 725/40 |
| 5,579,124 A | 11/1996 | Aijala et al. | |
| 5,585,838 A | 12/1996 | Lawler et al. | |
| 5,585,865 A | 12/1996 | Amano | |
| 5,589,892 A | 12/1996 | Knee et al. | |
| 5,596,994 A | 1/1997 | Bro | |
| 5,600,364 A | 2/1997 | Hendricks | |
| 5,600,366 A | 2/1997 | Schulman | |
| 5,606,359 A | 2/1997 | Youden et al. | |
| 5,606,602 A | 2/1997 | Johnson et al. | |
| 5,608,448 A | 3/1997 | Smoral et al. | |
| 5,619,247 A | 4/1997 | Russo | |
| 5,630,119 A | 5/1997 | Aristides | |
| 5,659,350 A | 8/1997 | Hendricks | |
| 5,661,516 A | 8/1997 | Carles | |
| 5,698,670 A | 12/1997 | Kurome et al. | |
| 5,710,815 A | 1/1998 | Ming et al. | |
| 5,721,827 A | 2/1998 | Logan et al. | |
| 5,724,521 A | 3/1998 | Dedrick | |
| 5,724,525 A | 3/1998 | Beyers, II et al. | |
| 5,724,607 A | 3/1998 | Brandt | |
| 5,740,549 A | 4/1998 | Reilly et al. | |
| 5,752,159 A | 5/1998 | Faust et al. | |
| 5,754,775 A | 5/1998 | Adamson et al. | |
| 5,754,939 A | 5/1998 | Herz | |
| 5,758,257 A | 5/1998 | Herz | |
| 5,758,259 A | 5/1998 | Lawler | |
| 5,774,170 A | 6/1998 | Hite et al. | |
| 5,778,182 A | 7/1998 | Cathey et al. | |
| 5,794,210 A | 8/1998 | Goldhaber et al. | |
| 5,796,952 A | 8/1998 | Davis et al. | |
| 5,798,785 A | 8/1998 | Hendricks et al. | |
| 5,809,481 A | 9/1998 | Baron et al. | |
| 5,818,438 A | 10/1998 | Howe | |
| 5,838,314 A | 11/1998 | Neel | |
| 5,848,396 A | 12/1998 | Gerace | |
| 5,848,397 A | 12/1998 | Marsh et al. | |
| 5,850,249 A | 12/1998 | Massetti et al. | |
| 5,850,447 A | 12/1998 | Peyret | |
| 5,854,897 A | 12/1998 | Radziewicz et al. | |
| 5,861,906 A | 1/1999 | Dunn | |
| 5,867,226 A | 2/1999 | Wehmeyer et al. | |
| 5,872,588 A | 2/1999 | Aras et al. | |
| 5,872,834 A | 2/1999 | Teitelbaum et al. | |
| 5,883,942 A | 3/1999 | Lim et al. | |
| 5,892,508 A | 4/1999 | Howe | |
| 5,892,536 A | 4/1999 | Logan | |
| 5,901,209 A | 5/1999 | Tannenbaum et al. | |
| 5,917,481 A | 6/1999 | Rzeszewski | |
| 5,945,988 A | 8/1999 | Williams et al. | |
| 5,946,636 A | 8/1999 | Uyeno et al. | |
| 5,948,061 A | 9/1999 | Merriman et al. | |
| 5,973,683 A | 10/1999 | Cragun | |
| 5,983,227 A | 11/1999 | Nazem | |
| 5,991,735 A | 11/1999 | Gerace | |
| 5,991,799 A | 11/1999 | Yen et al. | |
| 6,002,393 A | 12/1999 | Hite | |
| 6,005,597 A | 12/1999 | Barrett | |
| 6,026,368 A | 2/2000 | Brown et al. | |
| 6,029,045 A | 2/2000 | Alexander | |
| 6,029,195 A | 2/2000 | Herz | |
| 6,076,094 A | 6/2000 | Cohen | |
| 6,081,840 A * | 6/2000 | Zhao | 709/224 |
| 6,100,916 A | 8/2000 | August | |
| 6,119,098 A * | 9/2000 | Guyot et al. | 705/14 |
| 6,128,009 A | 10/2000 | Ohkura et al. | |
| 6,134,531 A | 10/2000 | Trewitt et al. | |
| 6,134,532 A | 10/2000 | Lazarus et al. | 705/14 |
| 6,160,570 A | 12/2000 | Sitnik | |
| 6,163,644 A | 12/2000 | Owashi et al. | |
| 6,172,674 B1 | 1/2001 | Etheredge | |
| 6,177,930 B1 | 1/2001 | Chernock et al. | |
| 6,177,931 B1 | 1/2001 | Alexander et al. | |
| D437,879 S | 2/2001 | Weinandt | |
| 6,185,614 B1 | 2/2001 | Cuomo | |
| 6,199,076 B1 | 3/2001 | Logan et al. | |
| 6,202,210 B1 | 3/2001 | Ludtke | |
| 6,226,618 B1 | 5/2001 | Downs et al. | |
| 6,236,975 B1 | 5/2001 | Boe et al. | |
| 6,252,586 B1 | 6/2001 | Freeman et al. | |
| 6,253,189 B1 | 6/2001 | Feezell et al. | |
| 6,279,157 B1 | 8/2001 | Takasu | |
| 6,282,713 B1 | 8/2001 | Kitsukawa | |
| 6,286,042 B1 | 9/2001 | Hasselberg et al. | |
| 6,292,549 B1 | 9/2001 | Lung et al. | |
| 6,304,644 B2 | 10/2001 | Karnowski | |
| 6,310,943 B1 | 10/2001 | Kowalski | |
| 6,314,568 B1 | 11/2001 | Ochiai | |
| 6,314,577 B1 | 11/2001 | Pocock | |
| 6,317,488 B1 | 11/2001 | DePond et al. | |
| 6,324,271 B1 | 11/2001 | Sawyer et al. | |
| 6,327,574 B1 * | 12/2001 | Kramer et al. | 705/14 |
| 6,332,021 B2 | 12/2001 | Latter et al. | |
| 6,339,639 B1 | 1/2002 | Henderson | |
| 6,341,161 B1 | 1/2002 | Latter et al. | |
| 6,345,187 B1 | 2/2002 | Berthoud et al. | |
| 6,345,256 B1 * | 2/2002 | Milsted et al. | 705/1 |
| 6,351,637 B1 | 2/2002 | Lee | |
| 6,353,929 B1 | 3/2002 | Houston | |
| 6,366,772 B1 | 4/2002 | Arnson | |
| 6,397,057 B1 | 5/2002 | Malackowski et al. | |
| 6,400,408 B1 | 6/2002 | Berger | |
| 6,408,437 B1 | 6/2002 | Hendricks et al. | |
| 6,427,003 B1 | 7/2002 | Corbett | |
| 6,434,747 B1 * | 8/2002 | Khoo et al. | 725/46 |
| 6,438,216 B1 | 8/2002 | Aktas | |
| 6,442,262 B1 | 8/2002 | Moss et al. | |
| 6,442,263 B1 | 8/2002 | Beaton et al. | |
| 6,445,781 B1 | 9/2002 | Heinmiller et al. | |
| 6,446,261 B1 * | 9/2002 | Rosser | 725/34 |
| 6,457,010 B1 | 9/2002 | Eldering | |
| 6,463,468 B1 | 10/2002 | Buch | |
| 6,463,585 B1 | 10/2002 | Hendricks et al. | |
| 6,477,704 B1 | 11/2002 | Cremia | |
| 6,480,589 B1 | 11/2002 | Lee et al. | |
| 6,487,538 B1 * | 11/2002 | Gupta et al. | 705/14 |
| 6,493,439 B2 | 12/2002 | Lung et al. | |
| 6,496,569 B2 | 12/2002 | Pelletier et al. | |
| 6,496,571 B1 | 12/2002 | Wilson | |
| 6,496,818 B1 | 12/2002 | Ponte | |
| 6,498,841 B2 | 12/2002 | Bull et al. | |
| 6,505,348 B1 | 1/2003 | Knowles et al. | |
| 6,507,839 B1 | 1/2003 | Ponte | |
| 6,510,417 B1 | 1/2003 | Woods | |
| 6,529,591 B1 | 3/2003 | Dosani et al. | |

| Patent No. | Date | Inventor(s) |
|---|---|---|
| 6,530,082 B1 | 3/2003 | DelSesto et al. |
| 6,542,583 B1 | 4/2003 | Taylor |
| 6,542,591 B1 | 4/2003 | Amro et al. |
| 6,546,092 B2 | 4/2003 | Corbett et al. |
| 6,553,110 B1 | 4/2003 | Peng |
| 6,553,178 B2 | 4/2003 | Abecassis |
| 6,560,317 B1 | 5/2003 | Quagliana |
| 6,560,327 B1 | 5/2003 | McConnell |
| 6,570,971 B2 | 5/2003 | Latter et al. |
| 6,571,344 B1 | 5/2003 | Sitnik |
| 6,574,319 B2 | 6/2003 | Latter et al. |
| 6,584,490 B1 | 6/2003 | Schuster et al. |
| 6,631,181 B1 | 10/2003 | Bates et al. |
| 6,631,360 B1 | 10/2003 | Cook |
| 6,639,979 B1 | 10/2003 | Kim |
| 6,647,548 B1 | 11/2003 | Lu et al. |
| 6,650,743 B2 | 11/2003 | Heinmiller et al. |
| 6,675,383 B1 | 1/2004 | Wheeler et al. |
| 6,698,020 B1 | 2/2004 | Zigmond et al. |
| 6,714,992 B1 * | 3/2004 | Kanojia et al. ............... 719/321 |
| 6,718,021 B2 | 4/2004 | Crockett et al. |
| 6,718,551 B1 * | 4/2004 | Swix et al. .................. 725/32 |
| 6,728,355 B2 | 4/2004 | Kowalski |
| 6,731,727 B2 | 5/2004 | Corbett et al. |
| 6,738,978 B1 | 5/2004 | Hendricks et al. |
| 6,748,058 B1 | 6/2004 | Schwend et al. |
| 6,748,068 B1 | 6/2004 | Walsh et al. |
| 6,757,691 B1 | 6/2004 | Welsh et al. |
| 6,766,003 B2 | 7/2004 | Moss et al. |
| 6,766,524 B1 | 7/2004 | Matheny et al. |
| D494,953 S | 8/2004 | Leung |
| 6,771,754 B2 | 8/2004 | Pelletier et al. |
| 6,771,755 B1 | 8/2004 | Simpson |
| 6,772,209 B1 | 8/2004 | Chernock |
| 6,785,301 B1 | 8/2004 | Chapman et al. |
| 6,785,368 B1 | 8/2004 | Eason et al. |
| 6,798,879 B1 | 9/2004 | Beham |
| 6,807,267 B2 | 10/2004 | Moss et al. |
| 6,810,115 B2 | 10/2004 | Fukuda |
| 6,810,527 B1 | 10/2004 | Conrad et al. |
| 6,816,481 B1 | 11/2004 | Adams et al. |
| 6,826,271 B1 | 11/2004 | Kanabar et al. |
| 6,831,974 B1 | 12/2004 | Watson et al. |
| 6,845,151 B2 | 1/2005 | Peng |
| 6,845,396 B1 * | 1/2005 | Kanojia et al. ............... 709/224 |
| 6,845,398 B1 | 1/2005 | Galensky et al. |
| 6,850,988 B1 * | 2/2005 | Reed ..................... 709/238 |
| 6,950,804 B2 | 9/2005 | Strietzel |
| 6,970,641 B1 | 11/2005 | Pierre |
| 6,976,268 B2 | 12/2005 | Courtney |
| 6,983,478 B1 | 1/2006 | Grauch |
| 6,985,882 B1 | 1/2006 | Del Sesto |
| 7,000,245 B1 | 2/2006 | Pierre |
| 7,010,492 B1 | 3/2006 | Bassett et al. |
| 7,020,336 B2 | 3/2006 | Cohen-Solal |
| 7,020,652 B2 | 3/2006 | Matz |
| 7,039,599 B2 | 5/2006 | Merriman |
| 7,039,932 B2 | 5/2006 | Eldering |
| 7,086,075 B2 | 8/2006 | Swix |
| 7,093,932 B2 | 8/2006 | Eldering |
| 7,100,183 B2 | 8/2006 | Kunkel et al. |
| 7,212,979 B1 | 5/2007 | Matz |
| 7,260,823 B2 | 8/2007 | Schlack et al. |
| 7,269,835 B2 | 9/2007 | Swix |
| 7,343,354 B2 | 3/2008 | Hennessey |
| 7,441,260 B1 | 10/2008 | Kurapati |
| 7,444,658 B1 | 10/2008 | Matz |
| 7,587,323 B2 | 9/2009 | Matz |
| 7,587,732 B2 | 9/2009 | Wright et al. |
| 7,593,858 B2 | 9/2009 | Matz |
| 7,617,508 B2 | 11/2009 | Gray |
| 7,661,118 B2 | 2/2010 | Matz |
| 2001/0004733 A1 | 6/2001 | Eldering |
| 2002/0004382 A1 | 1/2002 | Cox et al. |
| 2002/0009184 A1 | 1/2002 | Shnier |
| 2002/0013757 A1 | 1/2002 | Bykowsky |
| 2002/0016748 A1 | 2/2002 | Emodi et al. |
| 2002/0016964 A1 | 2/2002 | Aratani et al. |
| 2002/0032906 A1 | 3/2002 | Grossman |
| 2002/0035600 A1 | 3/2002 | Ullman et al. |
| 2002/0046099 A1 * | 4/2002 | Frengut et al. ............... 705/14 |
| 2002/0049631 A1 | 4/2002 | Williams |
| 2002/0049967 A1 | 4/2002 | Haseltine et al. |
| 2002/0056109 A1 | 5/2002 | Tomsen |
| 2002/0056118 A1 * | 5/2002 | Hunter et al. ............... 725/87 |
| 2002/0078443 A1 | 6/2002 | Gadkari et al. |
| 2002/0083441 A1 | 6/2002 | Flickinger et al. |
| 2002/0087573 A1 | 7/2002 | Reuning et al. |
| 2002/0090933 A1 | 7/2002 | Rouse et al. |
| 2002/0092017 A1 | 7/2002 | Klosterman et al. |
| 2002/0100064 A1 | 7/2002 | Ward et al. |
| 2002/0122401 A1 | 9/2002 | Xiang et al. |
| 2002/0123928 A1 | 9/2002 | Eldering et al. |
| 2002/0133817 A1 | 9/2002 | Markel |
| 2002/0143647 A1 | 10/2002 | Headings et al. |
| 2002/0157108 A1 | 10/2002 | Kitsukawa et al. |
| 2002/0157109 A1 | 10/2002 | Nakano et al. |
| 2002/0169709 A1 | 11/2002 | Kitayama |
| 2002/0183098 A1 | 12/2002 | Lee et al. |
| 2002/0191755 A1 | 12/2002 | Lew et al. |
| 2002/0199197 A1 | 12/2002 | Winter |
| 2003/0003990 A1 | 1/2003 | Von Kohorn |
| 2003/0028432 A1 | 2/2003 | Troyansky et al. |
| 2003/0028873 A1 | 2/2003 | Lemmons |
| 2003/0050100 A1 | 3/2003 | Dent |
| 2003/0067554 A1 | 4/2003 | Klarfeld |
| 2003/0092384 A1 | 5/2003 | Ross, III |
| 2003/0093792 A1 | 5/2003 | Labeeb et al. |
| 2003/0095650 A1 | 5/2003 | Mize |
| 2003/0108184 A1 | 6/2003 | Brown et al. |
| 2003/0110489 A1 | 6/2003 | Gudorf et al. |
| 2003/0110497 A1 | 6/2003 | Yassin et al. |
| 2003/0115597 A1 | 6/2003 | Yassin et al. |
| 2003/0148758 A1 | 8/2003 | McMullin |
| 2003/0149975 A1 | 8/2003 | Eldering et al. |
| 2003/0172374 A1 | 9/2003 | Vinson et al. |
| 2004/0125929 A1 | 7/2004 | Pope |
| 2004/0128682 A1 | 7/2004 | Liga et al. |
| 2004/0133467 A1 | 7/2004 | Siler |
| 2004/0163101 A1 | 8/2004 | Swix |
| 2004/0193483 A1 | 9/2004 | Wolan |
| 2004/0194131 A1 | 9/2004 | Ellis et al. |
| 2004/0248560 A1 | 12/2004 | Bedingfield et al. |
| 2004/0261127 A1 | 12/2004 | Freeman |
| 2005/0060759 A1 | 3/2005 | Rowe et al. |
| 2005/0071863 A1 | 3/2005 | Matz |
| 2005/0084084 A1 | 4/2005 | Cook et al. |
| 2005/0132419 A1 | 6/2005 | Gray |
| 2005/0137958 A1 | 6/2005 | Huber et al. |
| 2005/0235318 A1 | 10/2005 | Grauch |
| 2005/0251820 A1 | 11/2005 | Stefanik |
| 2005/0278741 A1 | 12/2005 | Robarts et al. |
| 2005/0283401 A1 | 12/2005 | Swix |
| 2005/0283792 A1 | 12/2005 | Swix |
| 2006/0031882 A1 | 2/2006 | Swix |
| 2006/0075456 A1 | 4/2006 | Gray |
| 2006/0106710 A1 | 5/2006 | Meek et al. |
| 2006/0161952 A1 | 7/2006 | Herz et al. |
| 2006/0253884 A1 | 11/2006 | Gray |
| 2006/0271438 A1 | 11/2006 | Shotland et al. |
| 2006/0271552 A1 | 11/2006 | McChesney et al. |
| 2006/0288367 A1 | 12/2006 | Swix |
| 2007/0038514 A1 | 2/2007 | Patterson et al. |
| 2007/0083885 A1 | 4/2007 | Harding |
| 2007/0226761 A1 | 9/2007 | Zalewski et al. |
| 2007/0250846 A1 | 10/2007 | Swix |
| 2007/0255622 A1 | 11/2007 | Swix |
| 2008/0004962 A1 | 1/2008 | Muthukrishnan et al. |
| 2008/0104634 A1 | 5/2008 | Gajdos et al. |
| 2008/0147497 A1 | 6/2008 | Tischer |
| 2008/0148311 A1 | 6/2008 | Tischer |
| 2008/0167943 A1 | 7/2008 | O'Neil |
| 2008/0263586 A1 | 10/2008 | Thomas |
| 2009/0292703 A1 | 11/2009 | Matz |
| 2010/0083298 A1 | 4/2010 | Gray |
| 2010/0100435 A1 | 4/2010 | Matz |
| 2010/0191601 A1 | 7/2010 | Matz |
| 2010/0257037 A1 | 10/2010 | Matz |

FOREIGN PATENT DOCUMENTS

| | | |
|---|---|---|
| EP | 0 424 648 A | 2/1991 |
| EP | 1 162 840 | 12/2001 |
| EP | 1162840 A2 | 12/2001 |
| WO | WO 9222983 | 12/1992 |
| WO | WO 94 17609 | 8/1994 |
| WO | WO 96-07270 | 3/1996 |
| WO | WO 9831114 | 7/1998 |
| WO | WO 99 04561 | 1/1999 |
| WO | WO 99 05461 A | 1/1999 |
| WO | WO 99-45702 | 9/1999 |
| WO | WO 99 45702 A | 9/1999 |
| WO | WO 99 52285 | 10/1999 |
| WO | WO 99 52285 A | 10/1999 |
| WO | WO 0147156 | 6/2001 |

OTHER PUBLICATIONS

"allNet Devices:—Report: Interactive TV Soon to Become Direct Marketing Tool," www.allnetdevices.com Feb. 21, 2000, 14 pages.

Liberate Technologies, www.solutions.liberate.com, date unknown, 7 pages.

Mixed Signals Technologies, Inc., "High Performance Server Array," www.mixedsignals.com, date: 2000; 1 page.

Ehrmantraut et al., "The Personal Electronic Program Guide—Towards the Pre-selection of Individual TV Programs", 8 Pages.

U.S. Appl. No. 08/779,306, Grauch.
U.S. Appl. No. 10/017,742, Matz.
U.S. Appl. No. 15/508,653, Matz.
U.S. Appl. No. 10/017,111, Matz.
U.S. Appl. No. 10/039,062, Matz.
U.S. Appl. No. 10/020,779, Swix.
U.S. Appl. No. 12/567,828, Gray.
U.S. Appl. No. 12/692,040, Swix.
U.S. Appl. No. 12/642,905, Matz.

"ACTV's HyperTV & 'Individualized Television' to be Powered by Sun Microsystems' JavaTV Technology," Business Wire, Apr. 21, 1999.

Wasserman, Todd, "Mining Everyone's Business." Brandweek, Feb. 28, 2000. 19 pages.

"power, flexibility, and control," RespondTV, www.respondtv.com/whyrespond.htrml (Nov. 16, 2001) pp. 1-2.

"It just clicks!," RespondTV, www. respondtv.com/inaction.html (Nov. 16, 2001) pp. 1-2.

Aggarwal et al ("A Framework for the Optimizing of WWW Advertising" Proceedings of the International IFIP/GI Working Conference Trends in Distributed Systems for Electronic Commerce, pp. 1-10, Year of Publication: 1998).

U.S. Appl. No. 09/799,306, filed Jan. 6, 1997, Grauch.
U.S. Appl. No. 10/016,988, filed Dec. 14, 2001, Matz.
U.S. Appl. No. 10/017,111, filed Dec. 14, 2001, Matz.
U.S. Appl. No. 10/017,630, filed Dec. 14, 2001, Swix.
U.S. Appl. No. 10/017,640, filed Dec. 14, 2001, Matz.
U.S. Appl. No. 10/017,742, filed Dec. 14, 2001, Matz.
U.S. Appl. No. 10/036,677, filed Dec. 21, 2001, Swix.
U.S. Appl. No. 10/036,923, filed Dec. 21, 2001, Swix.
U.S. Appl. No. 10/037,005, filed Dec. 21, 2001, Matz.
U.S. Appl. No. 10/778,345, filed Feb. 17, 2004, Swix.
PCT Publication No. WO 94/17609 (Kieft et al., Aug. 4, 1994).

Cauley, Leslie, "Microsoft, Baby Bell Form Video Alliance," *The Wall Street Journal*, Sep. 26, 1994.

"allNetDevices:—Report: Interactive TV Soon to Become Direct Marketing Tool," allNetDevices, www.devices.internet.com/com_cgi/print/print.cgi?url=http://devices . . ./report_interactive.html, (Nov. 16, 2001) pp. 1-2.

"Liberate Technologies—Solutions," Digital Cable Two-Way, www.solutions.liberate.com/architecture/dc2.html, (Nov. 16, 2001) p. 1 of 1.

"Liberate Technologies—Solutions," Digital Broadband Telco, www.solutions.liberate.com/architecture/db.html, (Nov. 16, 2001) p. 1 of 1.

"Liberate Technologies—Solutions," Liberate Connect Suite, www.solutions.liberate.com/products/connect_suite.html, (Nov. 16, 2001) pp. 1-2.

"Liberate Technologies—Solutions," Liberate imprint Server™ www.solutions.liberate.com/products/imprint_server.html, (Nov. 16, 2001) p. 1 of 1.

"Liberate Technologies—Solutions," Liberate Mediacast Server™ www.solutions.liberate.com/products/mediacast_server.html, (Nov. 16, 2001) pp. 1-2.

"Spike High Performance Server Array," Mixed Signals Technologies, Inc., www.mixedsignals.com, itvinfo@mixedsignals.com (2000) p. 1.

"power, flexibility, and control," RespondTV, www.respondtv.com/whyrespond.html. (Nov. 16, 2001) pp. 1-2.

"It just clicks!," RespondTV, www.respondtv.com/inaction.html, (Nov. 16, 2001) pp. 1-2.

"The Wink System," Wink System Diagram, www.wink.com/contents/tech_diagram.html, (Nov. 16, 2001) p. 1 of 1.

"What is Wink?," www.wink.com/contents/whatiswink.html, (Nov. 16, 2001) p. 1 of 1.

"How Wink Works," What is Wink: How wink works, www.wink.com/contents/howitworks.html, (Nov. 16, 2001) p. 1 of 1.

"What is Wink: Examples," What is Wink—Examples, www.wink.com/contents/examples.html, (Nov. 16, 2001) pp. 1-2.

"Nielsen Media Research—Who We Are & What We Do," www.nielsenmedia.com/whoweare.html, (Oct. 11, 2001) pp. 1-4.

www.actv.com, Screen Print, Oct. 8, 2000.

"ACTV, Inc. Offers Exclusive Preview of 'Individualized Television' at Official All-Star Café," Business Wire, Sep. 16, 1998.

"ACTV's HyperTV & 'Individualized Television' to be Powered by Sun Microsystems' JavaTV Technology," Business Wire, Apr. 21, 1999.

Whitaker, Jerry, "Interactive TV: Killer Ap or Technical Curiosity?", Broadcast Engineering, Dec. 1999.

Dickson, Glen, "Digital TV gets specifically directed," Broadcasting & Cable, Jun. 5, 2000.

Reed, David, "The future is digital," Precision Marketing, v. 13, n. 51, p. 27, Sep. 21, 2001.

Charu C. Aggarwal, Joel L. Wolf, and Philip S. Yu, "A Framework for the Optimizing of WWW Advertising," IBM T. J. Watson Research Center, Yorktown Heights, New York.

Respond TV, www.respondtv.com; date unknown, 4 pages.

Nielsen Media Research, "Who We Are and What We Do," www.nielsenmedia.com, date: 2001, 4 pages.

U.S. Appl. No. 10/735,309, filed Dec. 12, 2003, Gary.
U.S. Appl. No. 10/735,346, filed Dec. 12, 2003, Gary.

* cited by examiner

METHOD AND SYSTEM FOR TARGETED CONTENT DISTRIBUTION USING TAGGED DATA STREAMS

FIELD OF THE INVENTION

The present invention generally relates to networked media delivery systems. More particularly, the present invention relates to a method and system for targeting content to specific users.

BACKGROUND OF THE INVENTION

Computer and television networks have become the predominant communications means by which product vendors communicate information about products to users. Such information may involve advertising, as well as other content such as titles, descriptions, and prices of products such as movies, games, and books for presentation to a user. For example, an on-line mall may provide a list of such content items (e.g., books) that is presented to the user so that the user may select items in the list to purchase. In this case, the book titles, authors, and brief descriptions are the content items. Advertisements relate to another type of content that may be transmitted to users. A server device typically transmits the content to a client device where the content is presented to the user. Examples of server devices are the "head-end" of a cable service provider or a server computer on the Internet. The client device may be a television set-top-box (STB) or a client computer. Regardless of the particular communications environment, a primary goal of product vendors in providing content to users is to reach or target those users who are most likely to purchase the products.

With respect to targeting advertisements, traditional targeting techniques focus on reaching as large an audience as possible; i.e., mass media advertising. This mass media advertising strategy seeks to reach the most number of viewers to increase the odds of contacting the ones most likely to purchase the advertised product or service. Since mass media targeting is expensive, other techniques have been developed in an attempt to not only narrow the audience but also target specific users based on an evaluation of related items. For instance, targeting techniques focus on an analysis of the readers of a particular magazine or viewers of a particular television (TV) program. Then advertisers choose whether or not to advertise in conjunction with the related item; i.e., the magazine or the TV program. Inherent in these traditional content distribution techniques are the problems of overinclusion (targeting viewers who have no desire to purchase the product or service) and underinclusion (excluding potential consumers). Because these techniques assess consumer interest on the larger scale of program audiences instead of on an individual viewer basis, the techniques will always suffer from the squandered advertising dollars associated with overinclusion and underinclusion.

Additionally, traditional targeting techniques leave consumers inadequately informed about products that they might want to purchase. Because of overinclusion, consumers are inundated with advertisements for unwanted products. Due to the inundation, the consumers may miss advertisements for products they actually might want. Similarly, as a result of underinclusion, consumers are simply not informed about products they might want. Thus, overinclusion and underinclusion result in consumers' wasted time and energy in becoming informed about products they are not interested in.

More recent methods of targeting content to users have typically involved the server device keeping track of what content a client device uses most and transmitting that type of content to the client device. For example, on the Internet, various mechanisms are used to record the viewing habits of a user at a particular client computer. The content of the pages viewed is typically analyzed by a server computer to determine what topics are of interest to the user. The server places content, such as advertisements or links to other web sites, on the pages viewed by the user based on these particular topics of interest. These advertisements or links are often placed around the primary text or image in a web page and are commonly referred to as "banner ads." As another example, in a cable television network using a STB, the STB records content that is viewed by the user. Later, the head-end of the cable service provider polls the STB to determine what topics are of interest to the user of the STB. Based on these topics, the head-end transmits related content; e.g., specific advertisements and the like.

Unfortunately, these methods involve the client device providing the server device with information about the user of the client device. For instance, in the television environment, STBs provide personal user information to the head-end of the cable service provider. Moreover, in order to target the most likely consumer, the server device should be given as much information about the user as possible. Requiring the user's private information to be sent across a network to the server device renders the private information vulnerable to theft and resale to unknown third parties. The moment a user's private information is sent from the client device, how the information is used is essentially out of the user's control. As a result, in typical advertising systems, in order for the user to receive advertisements appropriate for the user, the user must give up some portion of his/her privacy, which is not acceptable to many users.

Additionally, with respect to many server devices, the personal information is gleaned via a two-way data communication method that involves multiple polling events. These polling events consume significant server resources and processing time, as well as bandwidth over the communications network. Consequently, the server interaction with the client in order to provide the user with appropriate content is inefficient.

It is with respect to these and other considerations that the present invention has been developed.

SUMMARY OF THE INVENTION

The present invention relates to a system and method of targeting content, such as advertisements and other content items, to particular types of users without the users divulging any private information over a network server system. The system and method involves a server device that tags content based on predetermined criteria and then sends the tagged content to a client device. The client device receives the tagged content and uses the tags to filter the content locally based on a predetermined user profile.

In one embodiment, the invention relates to a method of targeting content to a user based on a user profile and content tags. Content is delivered to the user's client device. Each content item has a tag identifying a classification of the content. The client device recognizes and evaluates the tags to score each content item based on a local user profile. The content that has a score meeting a predetermined threshold is identified as being appropriate for presentation to the user. Appropriate content may then be selected and presented to the user. Generally, the user profile is a set of tags describing the classifications of content that are most appropriate for the user. The profile may be developed based on usage history or demographic information. The client device may also have a tag dictionary that may be updated to correspond to a common set of tags utilized by advertisers and/or server devices.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

DETAILED DESCRIPTION

Figure 1:
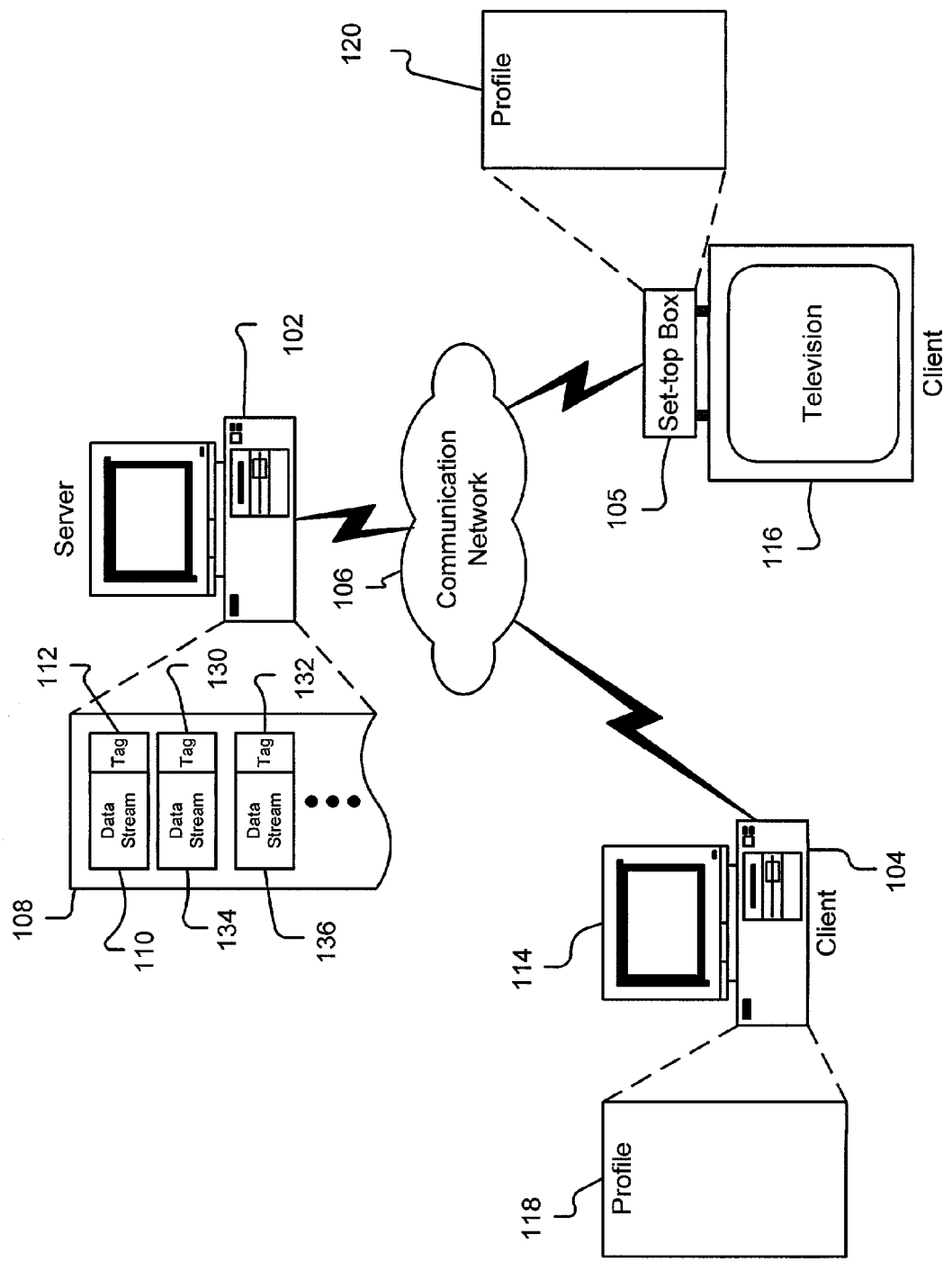
FIG. 1 is an exemplary operating environment implementing an embodiment of the present invention.

The invention is described in detail below with reference to the figures. When referring to the figures, like structures and elements shown throughout are indicated with like reference numerals.

FIG. 1 illustrates an exemplary operating environment 100 employing an embodiment of the present invention. A server device 102 communicates with one or more client devices, such as client device 104 and/or client device 105, via a communication network 106. Server device 102 transmits media content, such as, but not limited to, video, audio, text, or executable programs, over the communication network 106 to be used by the client devices 104 and/or 105. Each of the client devices 104 and/or 105 has an output device, such as a computer monitor 114, or a television screen 116, for presenting user-appropriate media content to the user.

The server device 102 has memory 108 that stores media content in the form of data streams 110, 134, and 136. The server device 102 also stores an associated tag, such as tags 112, 130, and 132, with each data stream 110, 134, and 136, respectively. Each of the tags 112, 130, and 132 may be unique from the others and may further be associated with user classifications such as user demographics or usage patterns. The tags are used by client devices 104 and 105 to filter content; i.e., to determine which data stream to provide to users at the client devices, such as 104 and 105. In an embodiment, two or more data streams are transmitted with the tags to the client devices. Client devices determine which of the received data streams are appropriate for the user of the client device 104 by analyzing the tag information. The client devices 104 and 105 have access to a user profile, such as user profile 118 and 120 that is further used to analyze the tag information to determine which content should be presented.

In one embodiment, the client device 104 is a computer system. In this embodiment, the communication network 106 may be the Internet communicating Extensible Markup Language (XML) or Hypertext Markup Language (HTML) data to the client device 104. In this embodiment the server device 102 is a web server or an e-commerce application server. The user profile 118 comprises tags corresponding to user preferences for content received from the Internet. Upon receipt of a data stream 110 and its associated tag 112, the desktop computer client 104 evaluates the tag 112 and the user profile 118 to determine which data stream 110, 134, or 136 is most appropriate for the user. In one embodiment, if the tag 112 is highly correlated with or matches a tag in the user profile 118, the associated data stream 110 is identified as being appropriate for presentation to the user of the desktop computer client device 104.

In another embodiment, the client device 105 is a set-top-box (STB). In this embodiment, the communication network 106 may be a satellite television broadcast network and the server 102 may be a head-end of a cable service provider. The cable service provider generally broadcasts programming, advertising, "walled garden" merchandising offers, and other content. As mentioned above, the media content is broadcasted in the form of data streams 110, 134, and 136 and associated tags 112, 130, and 132 to the STB 105. The STB 105 evaluates the tags 112, 130, and 132 and the STB user profile 120 to determine which of the data streams 110, 134, or 136 is most appropriate for the user of the STB 105. The STB 105 presents to the user the data stream(s) that are appropriate to the user based on the user profile 120.

While FIG. 1 depicts two types of client devices 104, a personal desktop computer, and 105, a television set top box (STB), it is to be understood that the client devices 104 and 105 may be any device operable to communicate via the communications network 106, and operable to receive data streams 110 and tags 112. By way of example, and not limitation, the client device 104 may be a personal digital assistant (PDA), a laptop computer, or a cellular telephone, among others. By way of further example, and not limitation, the communication network 106 may be wireless network, an Ethernet, a local area network (LAN), a wide area network (WAN), or a television broadcast network, among others.

Figure 2:
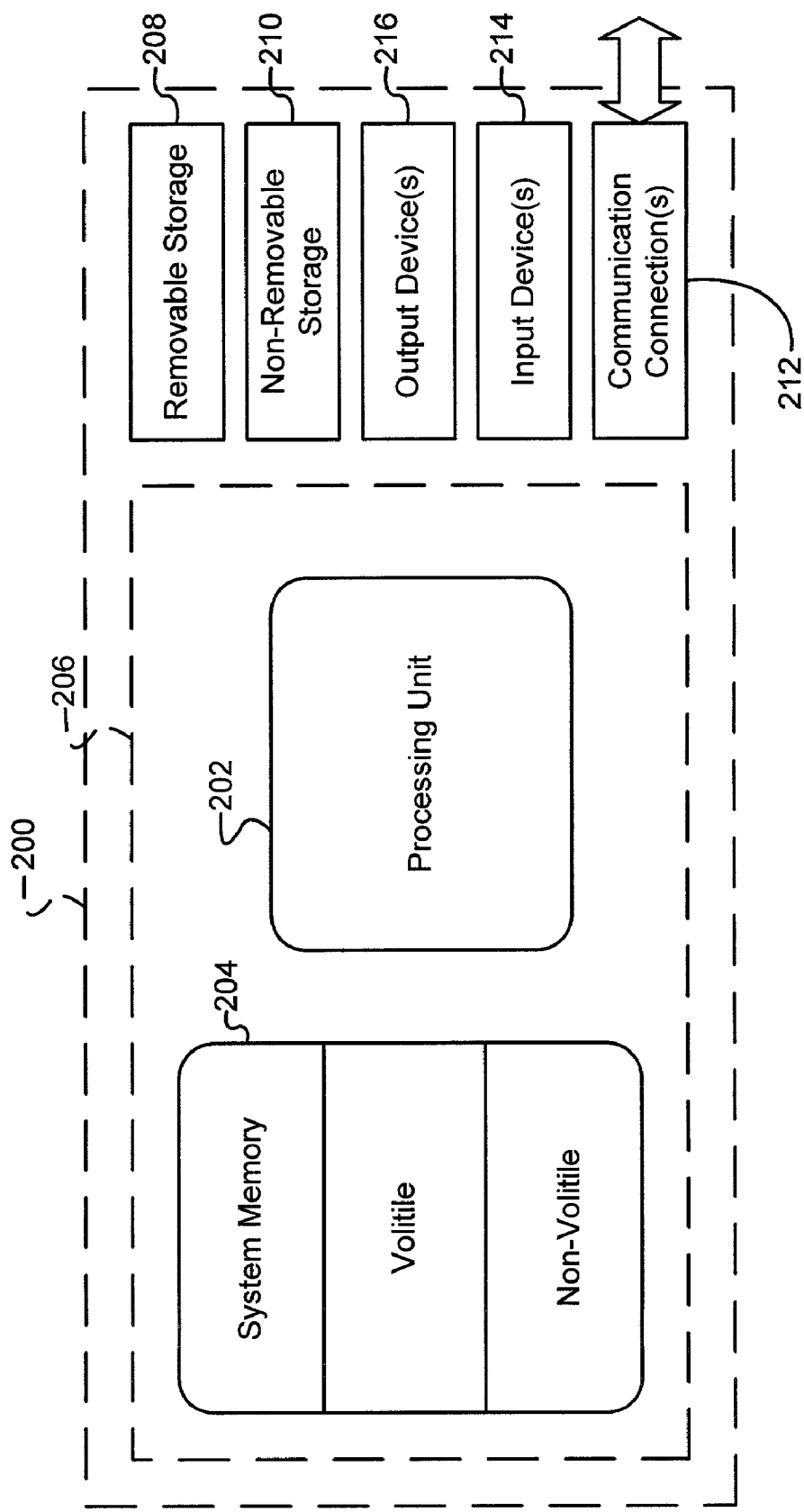
FIG. 2 is a computer system suitable for implementing an embodiment of the present invention.

FIG. 2 illustrates an exemplary system for implementing the invention with a computing device 200. In its most basic configuration, computing device 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210.

Computer storage media includes volatile and nonvolatile, removable and non-removable media implemented in any method or technology for storage of information such as computer readable instructions, data structures, program modules or other data. The memory 204, removable storage 208 and non-removable storage 210 are all examples of computer storage media. Computer storage media includes, but is not limited to, Random Access Memory (RAM), Read Only Memory (ROM), Electrically Erasable Programmable ROM (EEPROM), flash memory or other memory technology, CD-ROM, digital versatile disks (DVD) or other optical storage, magnetic cassettes, magnetic tape magnetic disk storage or other magnetic storage devices, or any other medium which can be used to store the desired information and which can be accessed by device 200. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Device 200 may also contain communications connection(s) 212 that allow the device to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes any information delivery media. By way of further example, and not limitation, communication media includes wired media such as a wired network or direct-wired connection, and wireless media such as acoustic, radio frequency (RF), infrared and other wireless media. The term computer readable media as used herein includes both storage media and communication media.

In one embodiment, the computing device 200 is the set-top box 105. In this particular embodiment, the set-top box 105 provides a control interface through which a subscriber makes viewing selections by, e.g., using a remote control unit, a keyboard, or a control panel. In providing this interface, the set-top box 105 performs the following functions: (1) routes traditional broadcast signals to the connected viewing device; (2) converts media content to a selected video format (e.g., NTSC or PAL) and presents the content to the subscriber; (3) for interactive systems, exchanges messages (including display data) with the server device 102 over distribution network 106; (4) receives messages from a subscriber input device, such as a remote control unit; (5) translates video signals from a network-native format into a format that can be used by the viewing device; (6) inserts alphanumeric or graphical information (e.g., program guides, menus, etc.) into the video stream to overlay that information on the video image; and (7) provides graphic or audio feedback to the subscriber. Examples of commercially available set-top boxes 105 that satisfy these functions include an SA Explorer 2000 set-top box by Scientific Atlanta, a DCT-5000 set-top box by Motorola/General Instruments, and a Z12C set-top box by Zenith.

Figure 3:
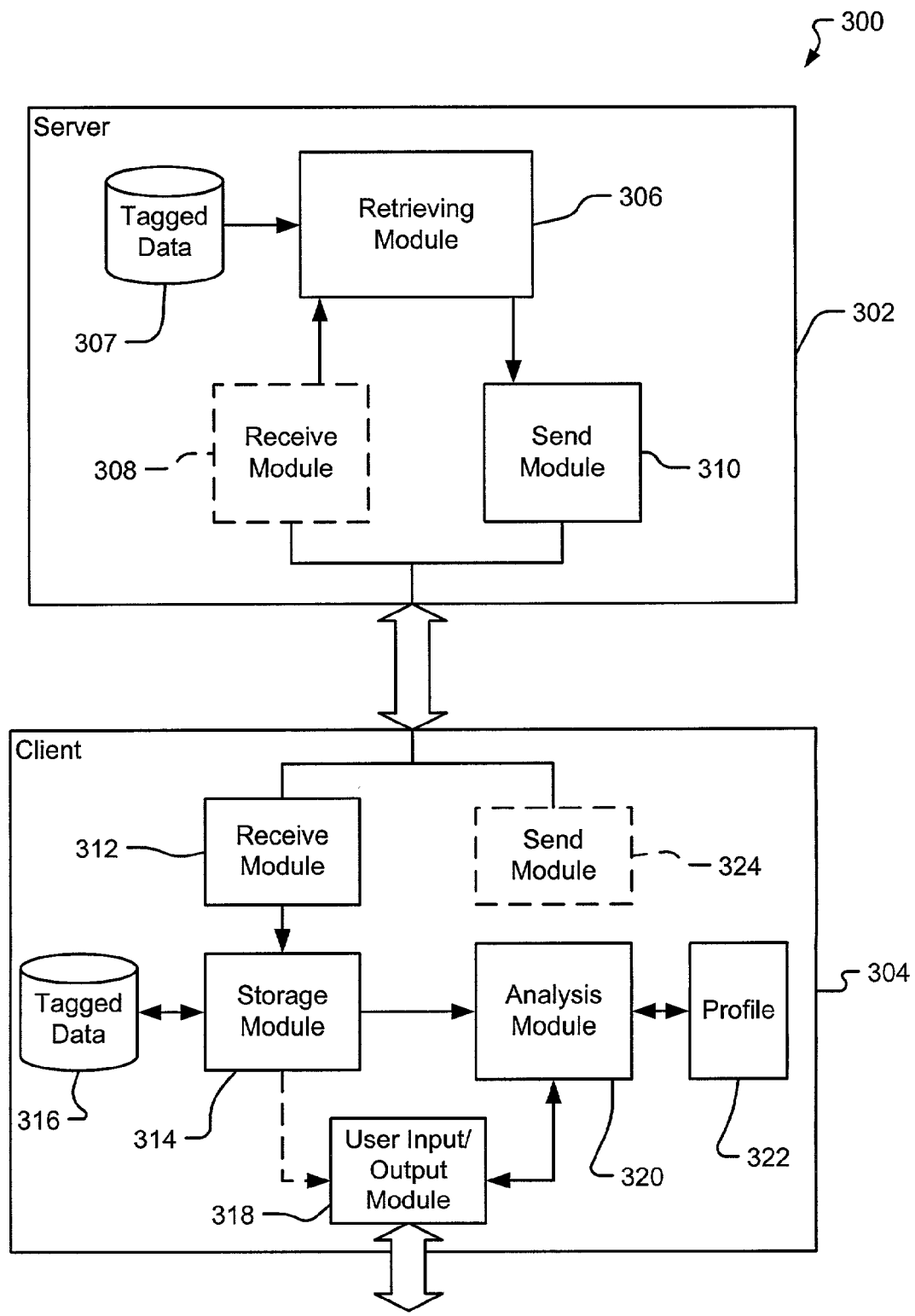
FIG. 3 is module diagram illustrating exemplary software, hardware, or firmware modules running in the computer system of FIG. 2.

FIG. 3 is a functional block diagram of a client-server system 300 employing an embodiment of the present invention. As discussed in more detail below, the client-server system 300 provides targeted content to users of the system 300. The content may include advertising and non-advertising content, including, but not limited to, news, games, programming, books, and sports. A server 302 transmits media content to a client 304. Media content sent by the server 302 is in a tagged data stream format. Data streams at the server 302 are tagged with tags corresponding to classifications of users. Classifications include, but are not limited to, demographics, such as viewing preferences, age, gender, location, and income. The tags allow the client device 304 to select among all data received by the client device so that the most appropriate content is provided to the user of the client device 304.

In one embodiment, the server device 302 includes a retrieving module 306, a receive module 308, and a send module 310. The receive module 308 receives requests from the client. An example of a request from the client 304 is a Hypertext Transport Protocol Request for an Internet page in on the server 302. In the response to the request, the server 302 uses a send module 310 to send multiple, tagged data streams of content to the client 304. The available tagged content is retrieved from a tagged data memory 307 by the retrieving module 306. The tagged data memory 307 contains tagged content items. Tagged content items are generally data streams with tags describing predetermined classifications such as demographics categories associated with the data streams. The server device 302 may obtain the tagged content items from content providers (e.g., advertisers) that tag the content based on the type of user targeted by the content providers or the server may tag the items itself. The send module 310 receives the tagged content items from the retrieving module 306 and transmits the tagged content items to the client 304.

In another embodiment, the server device 302 does not have a receive module 308, for instance, in some cases, the server device 302 primarily broadcasts content onto a broadcast network (e.g., satellite TV). In this embodiment, an STB 105 connected to the broadcast network receives the broadcasted content, but does not need to send information back to the server device 302. Thus, as is discussed below, the send module of the client device 304 is not necessary in the broadcast TV/STB implementation. In this embodiment, the STB 105 simply receives multiple, tagged data streams of content sent by the server device 302 and filters the content locally.

The client device 304 includes a receive module 312, which receives the transmitted tagged data streams from the server device 302. The receive module 312 performs all tasks associated with receiving data from the server 302, including detecting incoming data, and synchronizing to receive the data. The receive module 312 sends the tagged data to a storage module 314, which stores the received tagged data in a tagged data memory 316. The storage module 314 may store the tagged data in any arrangement in the tagged data memory 316 that is suitable for the particular implementation. For example, the storage module 314 may group certain types of content together. The storage module 314 may group advertising content together, games content together, movies content together, etc. Preferably, the tagged data will be organized in the tagged data memory 316 in a way to facilitate quick and efficient access but such organization is not necessary. The storage module 314 may also pass certain content straight through, without storage, to a user input/output module 318.

The user input/output module 318 performs tasks associated with conducting media content to an output device such as a display monitor, speakers, or a printer. The user input/output module 318 also performs tasks associated with receiving input from a user, such as mouse clicks, keyboard entry, or remote control entry. While a user inputs data, the user input/output module 318 detects the user input and may transmit the user input to an analysis module 320 for analysis. The analysis module 320 evaluates user input to detect patterns in the user input. Based on the detected usage patterns, the analysis module 320 updates a user profile 322.

For one embodiment, the analysis module 320 also detects events that prompt output of media content. Events that prompt output of media content are generally referred to as insertion events. The analysis module 320 may receive these events from the storage module 314 or the user input/output module 320. An event from the storage module 314 may be an advertisement insertion event, which indicates that an ad should be displayed to the user at a predetermined time. One example of an advertisement insertion event is a cue tone contained within the network TV broadcast, which may be transmitted along with other media content from the server 302. In general, insertion events that are received from the server 302 may be referred to as external or predetermined events because they arise externally from the client and indicate a predetermined time for display.

Another type of insertion event that the analysis module 320 may detect is an internal event that arises on the client side. One example of an internal insertion event is a user initiated menu selection from a STB navigator, such as the user requesting a list of available television shows, a list of games that are available to play online or the books available via the online bookstore. Each list of respective items offered may be tagged by the server system and filtered by the client device 304 so as to optimize the presentation order to the user that would present the item with the highest probability of interest. Furthermore, the initial navigator menu presented on the display may be customized automatically by the client device 304 based upon prior user behavior and profile so as to order the list of available activities or actions (e.g., preferences for television program, games, shopping, news, mail, etc), thereby presenting the user with a list best matching their probable activities. Additionally, such prior user behavior can be implemented by the client device 304 to exhibit content in a predetermined sequence (e.g., preferred content type displayed first upon user initiation of the device).

As a specific example, when a user turns on the user's television set and STB, the user immediately is presented with content, advertising, programming, etc which matches the user's profile. The user may then select a list of options of a certain type of media content. For example, the user may select that a list of games be shown from which the user can choose. The analysis module 320 would detect the user's selection of a list of games as an insertion event. A menu of a list of games may then be displayed so the user may select the game that he/she wants to play. The analysis module 320 again will receive an insertion event to insert the selected game into the output module. The analysis module 320, upon receiving an insertion event, accesses the storage module 314 to identify the most appropriate media content that should be displayed to the user.

The storage module 314 transmits tagged data to the analysis module 320, which filters the tagged data using tag information stored in the user profile 322. The analysis module 320 determines which tagged data in the tagged data memory 316 most closely matches tags or tag information in the user profile 322. The tagged data that most closely matches the information in the profile 322 is transmitted to the user input/output module 318 for presentation to the user. Thus, the content that is presented to the user is the content from the server 302 that most closely matches the user profile 322, and is thereby the most appropriate for the user's preferences. Advantageously, the selection of the most appropriate media content to present to the user is made without transmitting to the server device 302 any or substantially little private user information. Thus, unlike other systems, the media content can be targeted to a user without the user giving up his or her privacy.

In one embodiment, the client device 304 has a send module 324 for sending data, such as requests, to the server device 302. An example of this embodiment is a client computer communicating to a server computer over the Internet, wherein the client computer sends Hypertext Transport Protocol (HTTP) requests to the server computer to browse web pages.

In another embodiment, the client device 304 need not have a send module 324. As discussed above, an example of this embodiment is a STB 105 receiving content from a broadcast TV network. In this embodiment, the STB 105 does not send requests for data. Rather, the server device 302 (e.g., head-end of a cable service provider) is constantly broadcasting content on a number of channels that the STB 105 can switch to.

With specific reference to an embodiment employing the STB 105, the STB 105 employs modules such as those depicted in FIG. 3 to complete many intelligent functions, including the collection, storage, exchange, and display of data. To satisfy these functions, the STB 105 has a navigator, an operating system, and a memory buffer. The operating system is a computer program that, after being initially loaded into the STB 105 by a bootstrap program, manages the other programs, or applications, running on the STB 105. The navigator is a software application running on top of the operating system. The navigator is provided by the user I/O module 318 and generates menu screens and accepts viewer menu selections such as movie orders, preview orders, or requests to enter an interactive "walled-garden" environment that may supply news, offer products, etc. Based on these selections, the navigator directs the storage module 314 to deliver the selected program, e.g., the storage module 314 plays the selected movie. In addition, the navigator records viewer selections or event data in memory, such as memory 204. As is discussed below, the recorded viewer selections or event data may be analyzed by the analysis module 320 to detect usage patterns.

Figure 4:
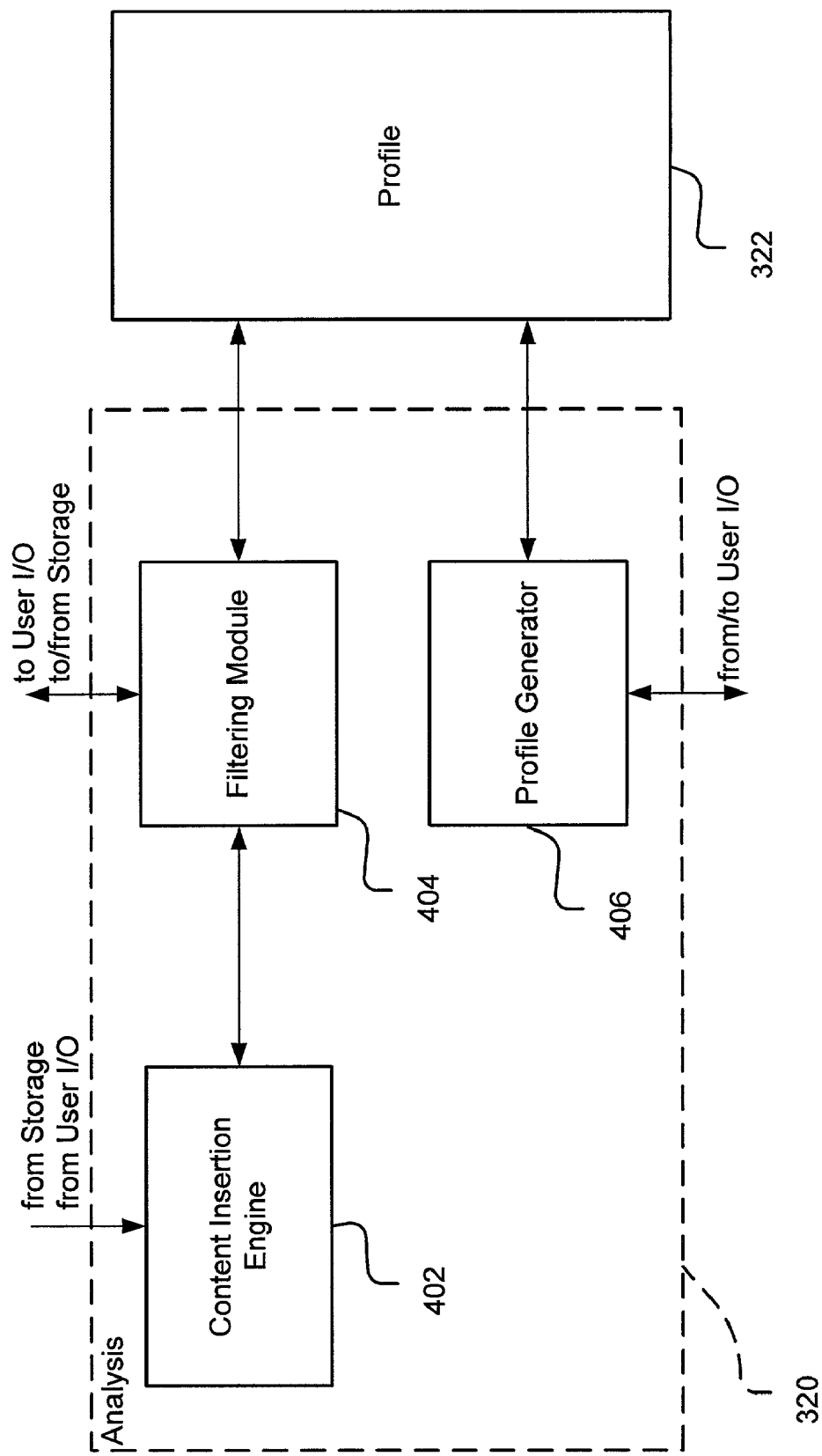
FIG. 4 is a functional block diagram of an analysis module shown in FIG. 3 in accordance with aspects of a particular embodiment of the invention.

FIG. 4 is a more detailed functional block diagram of an analysis module such as the analysis module 320 in accordance with aspects of a particular embodiment of the invention. The analysis module 320 includes a content insertion engine 402, a filtering module 404, and a profile generator 406. The content insertion engine 402 receives data from the storage module 314 and the user I/O module 318, and determines whether an insertion event occurs. By way of example, for video advertising, the insertion event may be a network cue-tone. If an insertion event does occur, the content insertion engine 402 transmits an insert command to the filtering module 404 to indicate that media content is to be inserted (i.e., presented to the user). In response to receiving the insert command, the filtering module 404 accesses tagged data from the storage module 314 and tags from the profile 322 to filter out inappropriate media content stored in the tagged data memory 316. The filtering module 404 determines which data in the tagged data memory 316 is appropriate for presentation to the user based upon the tagged data's level of similarity to the tags in the profile 322. Determining the tagged data's level of similarity may be done by scoring each of the tags stored in the tagged data memory 316. As is discussed below in more detail, scoring the tags in the tagged data memory may involve determining the tags' relative correlation to the tags in the user profile 322. The filtering module 404 transmits a command to the user I/O module 318 to output the appropriate media content. The filtering module 404 may send a message to either the user I/O module 318 to get the appropriate content from the storage module 314. Alternatively, the filtering module 404 may transmit a message to the storage module 314 to instruct the storage module 314 to transmit the appropriate content to the user I/O module 318.

The profile generator 406 receives data from the user i/o module 318 and updates the profile 322 according to inputs from the user. The profile generator 406 dynamically updates the profile 322 based on a history of user inputs so that when the filtering module 404 accesses the profile 322, the filtering module 404 will filter the tagged data memory 316 based on the most recent user preferences indicated by the profile 322. Alternatively profiles are static, and/or predetermined. The profile generator 406 preferably organizes tags in the profile 322 for fast and efficient access. In another embodiment, the tag information need not be organized for fast and efficient access.

The user profile 322 is preferably stored in memory accessible by one or more microprocessors of the client device 304. The memory that stores the user profile 322 can be any memory medium known in the art, including, but not limited to, Personal Computer Memory Card International Association (PCMCIA) memory, Random Access Memory (RAM), Read Only Memory (ROM), Electrically Erasable Programmable ROM (EEPROM), or hard disc drive memory. It should be understood that the user profile 322 need not be stored contiguously in memory and may be separated in a memory medium accessible through a file system that maps memory locations to data. In practice, one or more of the modules shown in FIGS. 3-4 may be integrated on a single integrated circuit in any combination. Alternatively, they may be separately implemented in software or hardware.

Figure 5:
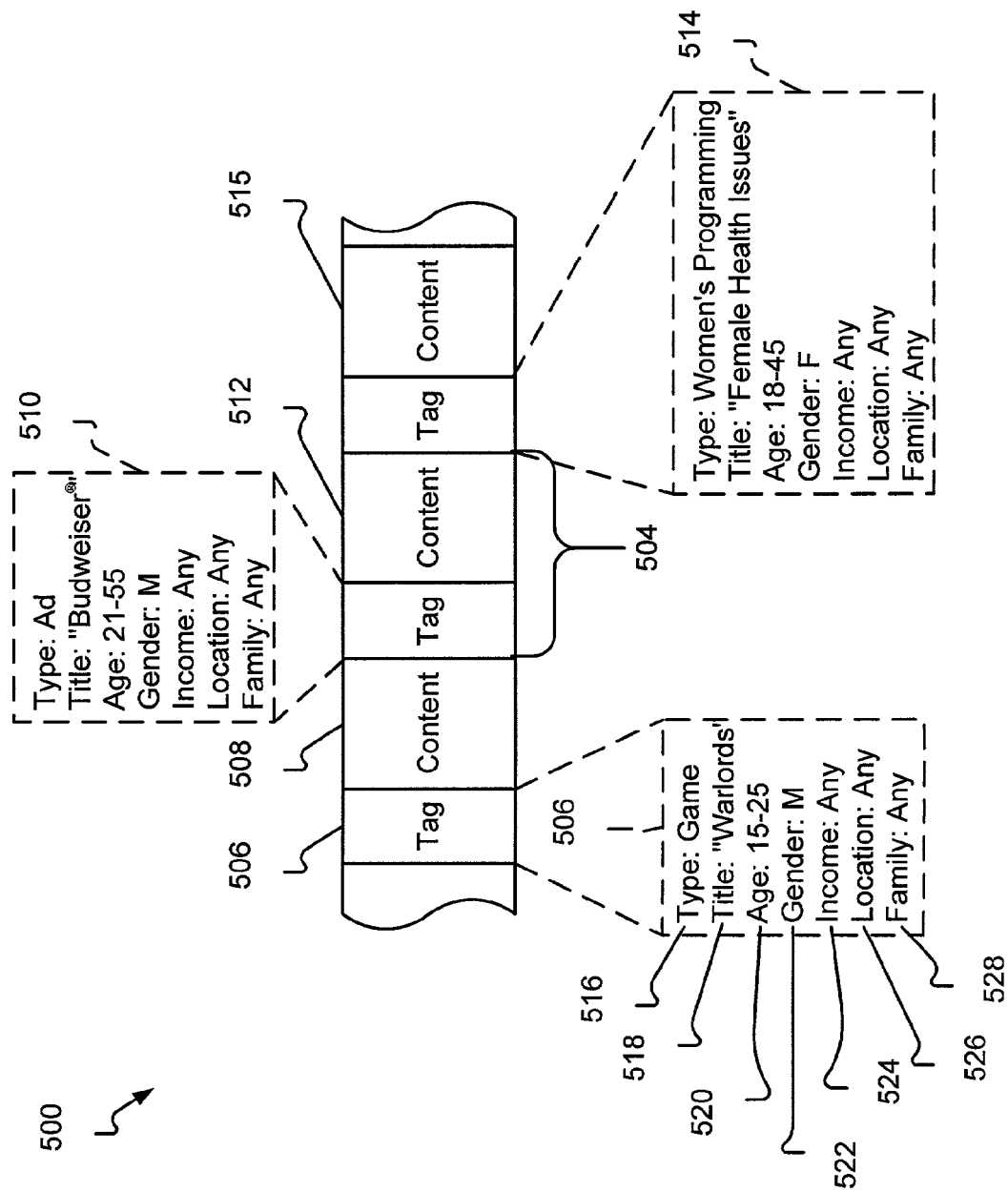
FIG. 5 illustrates an exemplary portion of tagged content that may be used in an embodiment of the present invention.

FIG. 5 illustrates a portion of tagged content 500 that may be used in an embodiment of the present invention. The portion of tagged content 500 includes tag/content pairs such as pair 504 including a tag, such as tag 510, and associated content, such as content 512. As discussed above, the content may be any type of content, including, but not limited to, advertisements, and content items containing descriptions (e.g., title, author, price, theme, etc) of content such as books, movies, games, etc. Each tag describes its associated content with predefined information. In one embodiment, the tags 506, 510, and 514 have a type identifier 516, a title identifier 518, an age identifier 520, a gender identifier 522, an income identifier 524, a location identifier 526, and a family identifier 528. The identifiers 518, 520, 522, 524, 526 and 528 relate to what type of viewer the content is appropriate for.

For example, the tag 510 indicates that the content 512 associated with the tag 510 is an advertisement about Budweiser® beer. The tag 510 further indicates that the content 512 is targeted for males from the ages 21-55. Additionally, the tag 510 indicates that the viewer who is targeted may be in any income level, at any location, and have any family characteristics (e.g., kids, married, etc.). The tags 506, 510, and 514, are appended to the content 508, 512, and 515, respectively by the server 302. The client 304 uses the tags to determine whether the content 508, 512, and 515 is appropriate for the user at the client device 304. The client 304 and server 302 utilize a common tag format.

In one embodiment, providers of content to the server device 302 tag the content before making it available to the server 302. The content providers fill in the identifiers, such as type, title, age, gender, income, location, and family, with the identifying data that the provider determines is the best target audience. In another embodiment, the server device 302 appends the tags to the content. In this embodiment the server device 302 is operable to determine what identifying information is most appropriate to the content and fill in each of the identifiers accordingly. The server device 302 has a dictionary of identifiers (e.g., type, title, age, gender, etc.) to select from. The tags that the client device 304 uses in the user profile 322 have the identifiers (e.g., type, title, age, gender, etc) selected from a common set of identifiers. Thus, the client device 304 and the server device 302 utilize a common tag format having common identifiers.

Over time, identifiers may change. For example, another identifier, such as "Education Level", may be added to the tag format. When the tag format changes, the switch to the new tag format at the server device 302 is preferably synchronized with the switch to the new tag format at the client device 304. While FIG. 5 illustrates exemplary identifiers in an exemplary format, it is to be understood that any identifiers may be used that effectively target users. It is envisioned, for example, that the "type" identifier may have "subtypes." This may occur when the type is "movie." A subtype further classifies the movie into genres such as, but not limited to, westerns, comedy, horror, drama, action, etc. Another example of subtyping is when the type is "sports." Subtypes of sports may be football, basketball, baseball, hockey, etc. Subtyping further targets users based on narrower classifications because the user profile 322 may be dynamically updated to track a user's selections of subtypes. Additionally, as is discussed in more detail below, tags may include a weight value associated with each identifier, indicating the relative importance of that identifier to the targeting of the content to users.

Figure 6:
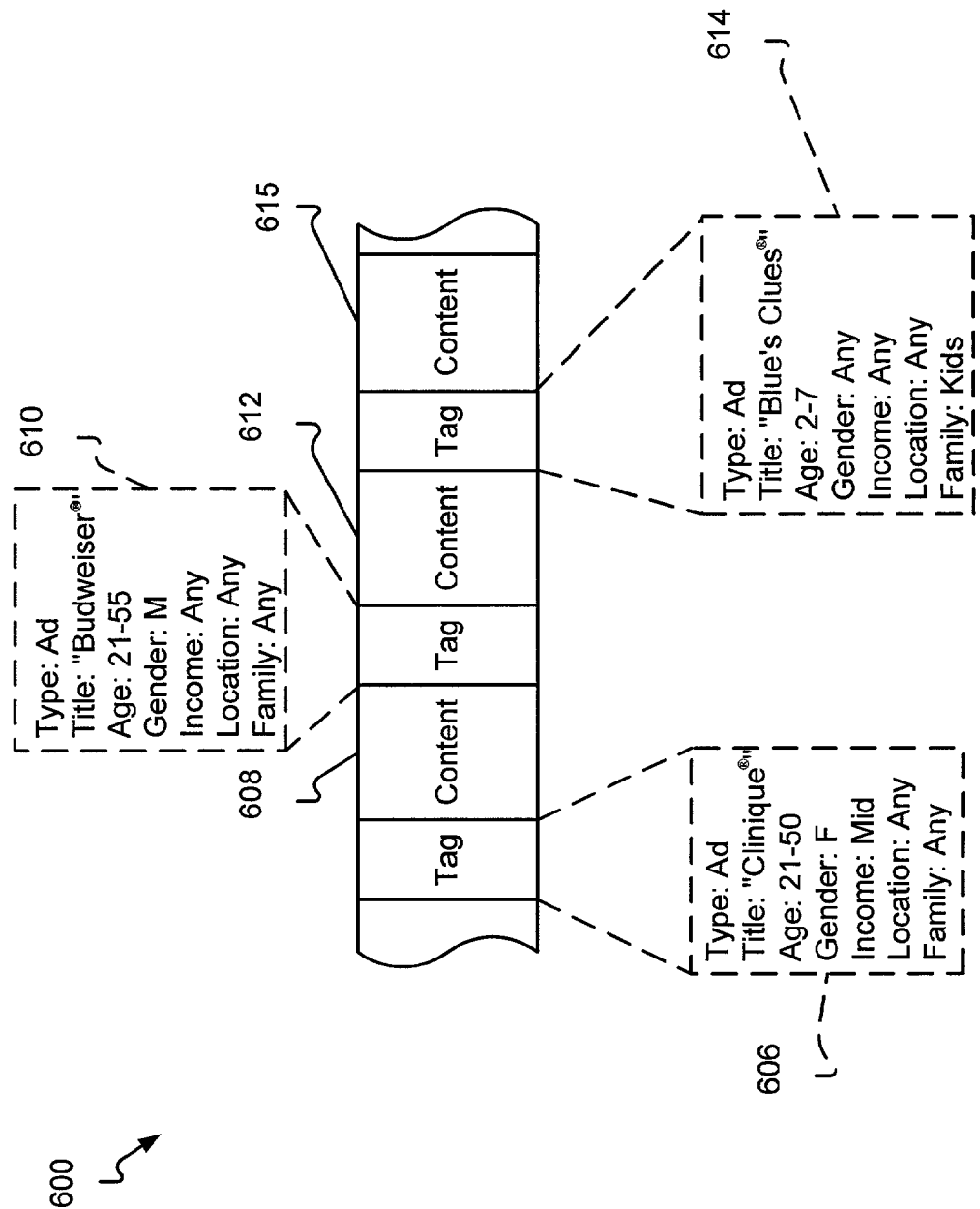
FIG. 6 illustrates another exemplary portion of tagged advertisement content that may be used in an embodiment of the present invention.

FIG. 6 illustrates another exemplary portion of tagged advertisement content that may be used in an embodiment of the present invention. Three advertisements 608, 612, and 615 are shown with associated tags 606, 610, and 614, respectively. Advertisement 608 is identified by its associated tag 606 to be an advertisement for Clinique® products and is directed to females of a middle income and from ages 21-50. Advertisement 612 is identified by its associated tag 610 as being an advertisement for Budweiser® products and is directed to males of from ages 21-55, of any income, location, or family arrangement. The advertisement 615 is identified by its associated tag 614 as being an advertisement for Blue's Clues® program for children ages 2-7, and a family arrangement with kids.

In embodiments described herein, the logical operations of the client device 304 and the server device 302 may be implemented as a sequence of computer implemented steps or program modules running on a microprocessor, such as, without limitation, a processor in a personal computer or a computer workstation. It will be understood to those skilled in the art that the client device 304 and the server device 302 of the present invention may also be implemented as interconnected machine logic circuits or circuit modules within a computing system. The implementation is a matter of choice dependent on the performance requirements of the computing system implementing the client device 304 and the server device 302. The operation, structural devices, acts, and/or modules described herein may be implemented in software, in firmware, in special purpose digital logic, and/or any combination thereof without deviating from the spirit and scope of the present invention as recited within the claims attached hereto. Furthermore, the various software routines or software modules described herein may be implemented by any means known in the art. For example, any number of computer programming languages, such as "C", "C++", Pascal, FORTRAN, assembly language, Java, etc., may be used. By way of further example, and not limitation, any scripting language known in the art may be used, such as Korn shell script. Furthermore, various programming approaches such as procedural, object oriented or artificial intelligence techniques may be employed.

The client device 304 and the server device 302 may be implemented as software modules executed by one or more general purpose computers, such as the general purpose computer 200 illustrated in FIG. 2. As described in greater detail below, the client device 304 may be employed to receive, store, filter, and present media content, such as movies, games, and/or advertisements. The client device 304 employs computer-readable media for carrying out the various tasks associated with targeting content to the user of the client device 304.

Figure 7:
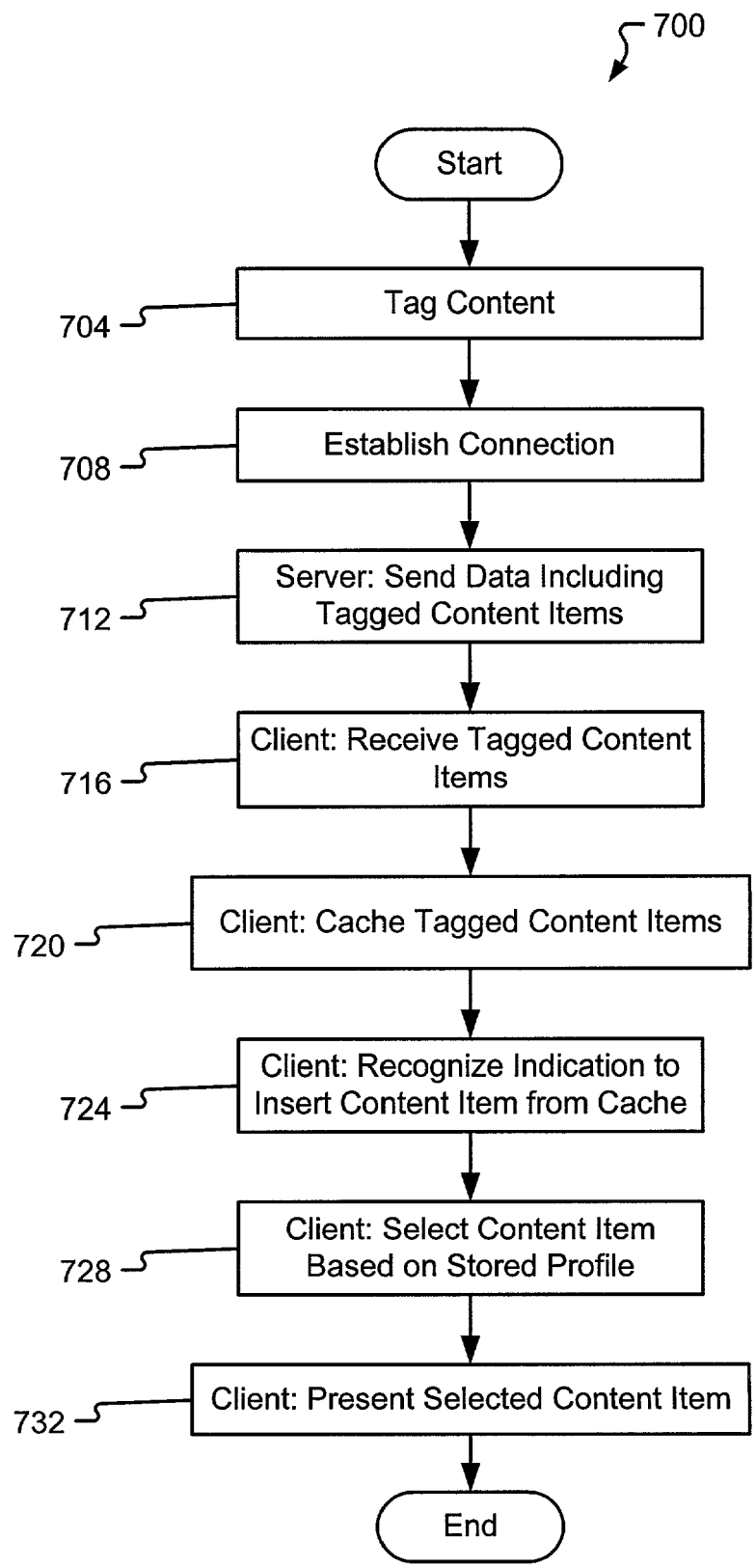
FIG. 7 is a flow diagram illustrating operations carried out in a targeted content distribution system in accordance with an embodiment of the present invention.

FIG. 7 is a chart illustrating operations carried out in a targeted content distribution system in accordance with an embodiment of the present invention. Initially, a tagging operation 704 tags content items that will be transmitted to the user of the client device 304. The server device 302 may perform the tagging operation. Alternatively, an advertiser that provides content to the server device 302 may perform the tagging operation 302. The tagging operation 704 involves associating tags describing relevant classifications with content items. As discussed with respect to FIG. 5, a tag includes identifier information for various classifications, such as demographics. The tagging operation 704 may involve assigning weighting values to tag identifiers, which indicate a relative importance of each identifier. Thus, for example, in the tagging operation 704, a tag for a beer ad may include age identification information of 21-55, with a relative weight of 1, and an income identification range of $30,000-$100,000, with a relative weight of 0.5. In this example, the tag indicates that targeting users in the identified income range is of less importance than targeting users in the identified age range.

After the content items are tagged, an establishing operation 708 establishes a communication connection between a client device 304 and a server device 302. Establishing a communication connection may be carried out using any means known in the art. By way of example, and not limitation, in an Internet environment a client computer typically send a request (e.g., a Hypertext Transport Protocol request) to a server computer to request a particular web page identified by a Universal Resource Locator (URL). As a further example, a connection may be established in a cable television environment by a set-top-box switching to a channel or transport frequency. Many other methods of establishing a communication connection are known in the art and will fall within the scope of the establishing operation 708.

The server device 302 then sends data to the client device 304 in a sending operation 712. The data includes more than one of the tagged content items that were tagged in the tagging operation 704. The server may send content items using any transmission protocol known in the art, including, but not limited to, a proprietary protocol. Sending the tagged content may include encoding the tagged content items, packetizing and/or formatting the encoded tagged content items, and modulating a carrier frequency with the packetized data. In the sending operation 712, the server may also append a unique client device identifier to the tagged content data such that a particular client device 304 is associated with the tagged content items. In a computer Internet environment, the client computer typically has a unique Internet Protocol (IP) address. In a cable television environment, each STB has a unique identifier. In general, each client device 304 may be uniquely identified on the network so that the server device 302 may send tagged content items directly to each client device in the sending operation 712.

As discussed above, the tagged content items that are sent in the sending operation 712 may be any content, including advertising. The server device 302 may send the content items in any order applicable to the implementation. For example, in one implementation it may be most efficient for the server device 302 to send all advertisements in a group; i.e., sequentially, and then all video content items sequentially, followed by all book content items sequentially, and so on.

In a receiving operation 716, the client device 304 receives the tagged content items that were sent in the sending operation 712. Generally, the client device 304 is detecting data on the communication network 106. In the receiving operation 716, the client device 304 detects tagged content items that are directed at the client device 304, demodulate, and decode packetized or formatted tagged content items. Depending on the particular implementation, the receiving operation 716 may involve synchronizing to a data signal from the server device 302. After the client device 304 receives the tagged content items in the receiving operation 716, the client device 304 may present one or more of the tagged content items to the user. The client device 304 may also cache the tagged content items in a caching operation 720.

In the caching operation 720, the tagged content items are stored in memory that is accessible by the client device 304 for possible later presentation to the user. The tagged content items may be logically stored in memory in any arrangement in the caching operation 720. For instance, the caching operation 720 may involve logically storing the tagged content items contiguously in memory as they are received. Alternatively, the caching operation 720 may logically group certain types of content (e.g., video content) together in memory. However the content items are arranged logically in memory, it is to be understood that the physical locations in the memory may not follow the logical arrangement.

During operation, the client device 304 may recognize an indication to insert one or more content items from the cache in a recognizing operation 724. Inserting a content item generally refers to presenting the content item to the user. The manner in which the content item is presented to the user is generally related either spatially (e.g., on a display monitor) or temporally (e.g., synchronized in time) to other content that is sent to the client device 304. In the recognizing operation 714, in a STB/TV environment, the client device 304 may receive a cue tone from the head-end, which indicates that an advertisement is to be displayed at a designated time. Also in the STB/TV environment, the client device 304 may receive input from the user to display a menu of content items (e.g., games). In this case, the input from the user is an indication to insert one or more content items (e.g., game content items) in a menu to the user.

After the client device 304 recognizes an indication to insert content, the client device 304 performs a selecting operation 728. In the selecting operation 728, the client device 304 evaluates the tags that were stored in the caching operation 720 based on a user profile (e.g., user profile 322), to determine whether one or more of the stored content items is appropriate for presentation to the user. Any method of evaluation may be employed by the client device 304 in the selecting operation 728 to select one or more appropriate content items. In one embodiment, if none of the stored content items are determined to be appropriate in the selecting operation 728, a default content item may be presented. An exemplary method of evaluation is discussed in detail below in reference to FIGS. 10-12. In a presenting operation 732, the client device 304 presents to the user the one or more content items that were identified as appropriate in the selecting operation 728.

Figure 8:
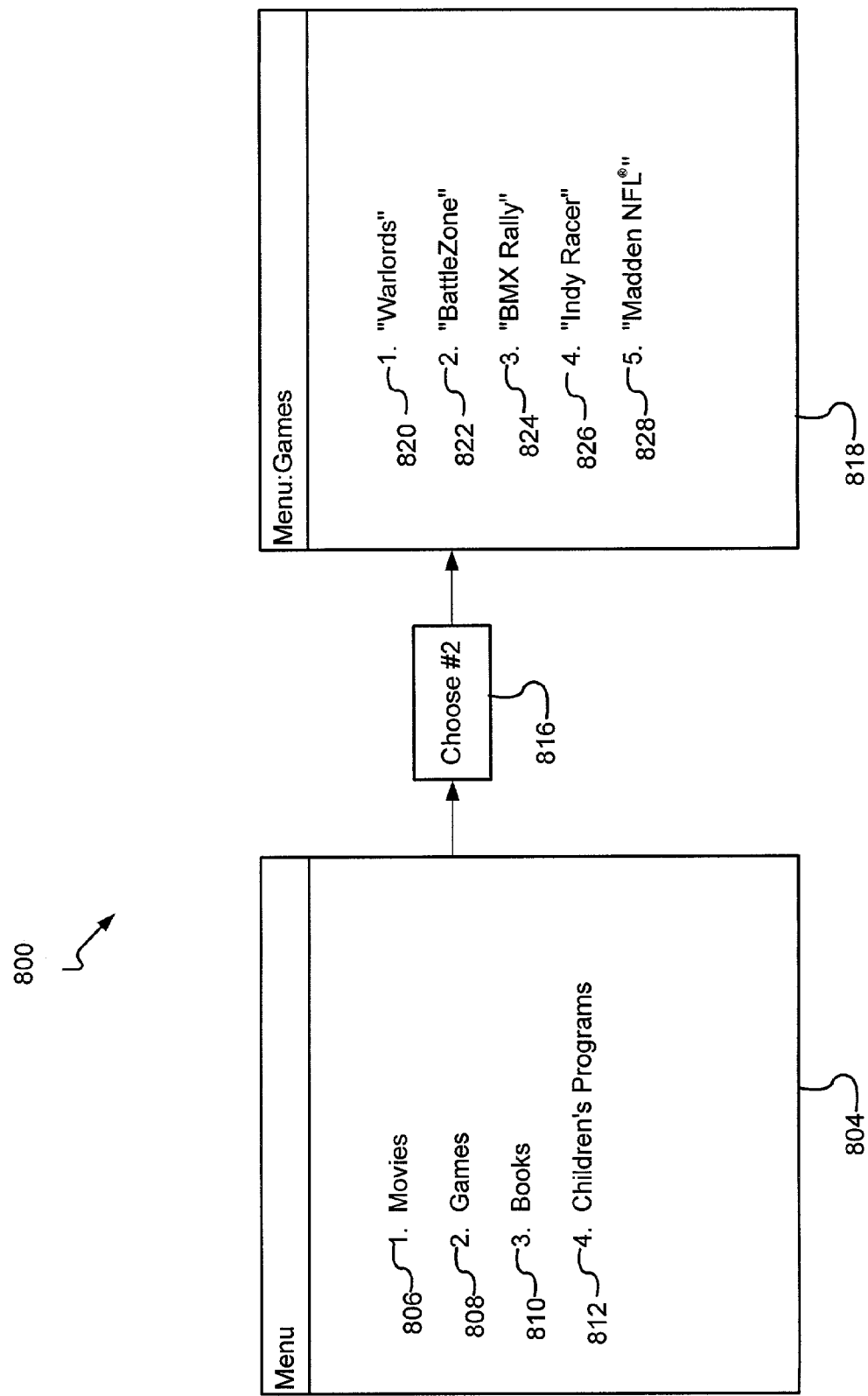
FIG. 8 illustrates an exemplary user interface that may be presented to a user of a client device in an embodiment of the present invention.

FIG. 8 illustrates an exemplary user interface 800 that may be presented to a user of a client device 304 in an embodiment of the present invention. The user interface 800 includes two menus presented to the user allowing the user to make selections. A content type menu 804 presents the user with four types of content from which to choose: movie content 806, games content 808, books content 810, and children's programming content 812. The user may select any of the items listed in the content type menu 804 to obtain a list of content items of the selected content type. As illustrated, the user chooses 816 the games content 808. When the user chooses 816 the games content 808, a games menu 818 is displayed with a list of five available and appropriate games: "Warlords" 820, "BattleZone" 822, "BMX Rally" 824, "Indy Racer" 826, and "Madden NFL" 828. The user may then select one of the games listed on the games menu 818 to get more information about a particular game. Most relevant to the present invention is the process that occurs when the user chooses, at choose operation, 816 one of the games content item 808.

When the user chooses 816 the games content item 808, a content insertion event arises from the user I/O module 318. The user I/O module 318 sends a message to the content insertion module 402 (FIG. 4) indicating that a list of appropriate games is to be presented to the user. Additionally, the list of games will preferably be sorted in order of user preference. The content insertion engine 402 responds by sending a message to the filtering module 404 notifying the filtering module 404 to filter games content items and provide the most appropriate or preferred game. In one embodiment, the content insertion engine 402 employs the filtering module 404 five times to obtain the five most appropriate game content items available in the tagged data memory 316. The content insertion engine 402 then sends the list of five game content items to the user I/O module 318 for presentation to the user on the games content menu 818.

Generally, prior to filtering content in response to insertion events, a user profile 322 is established for targeting purposes.

Figure 9:
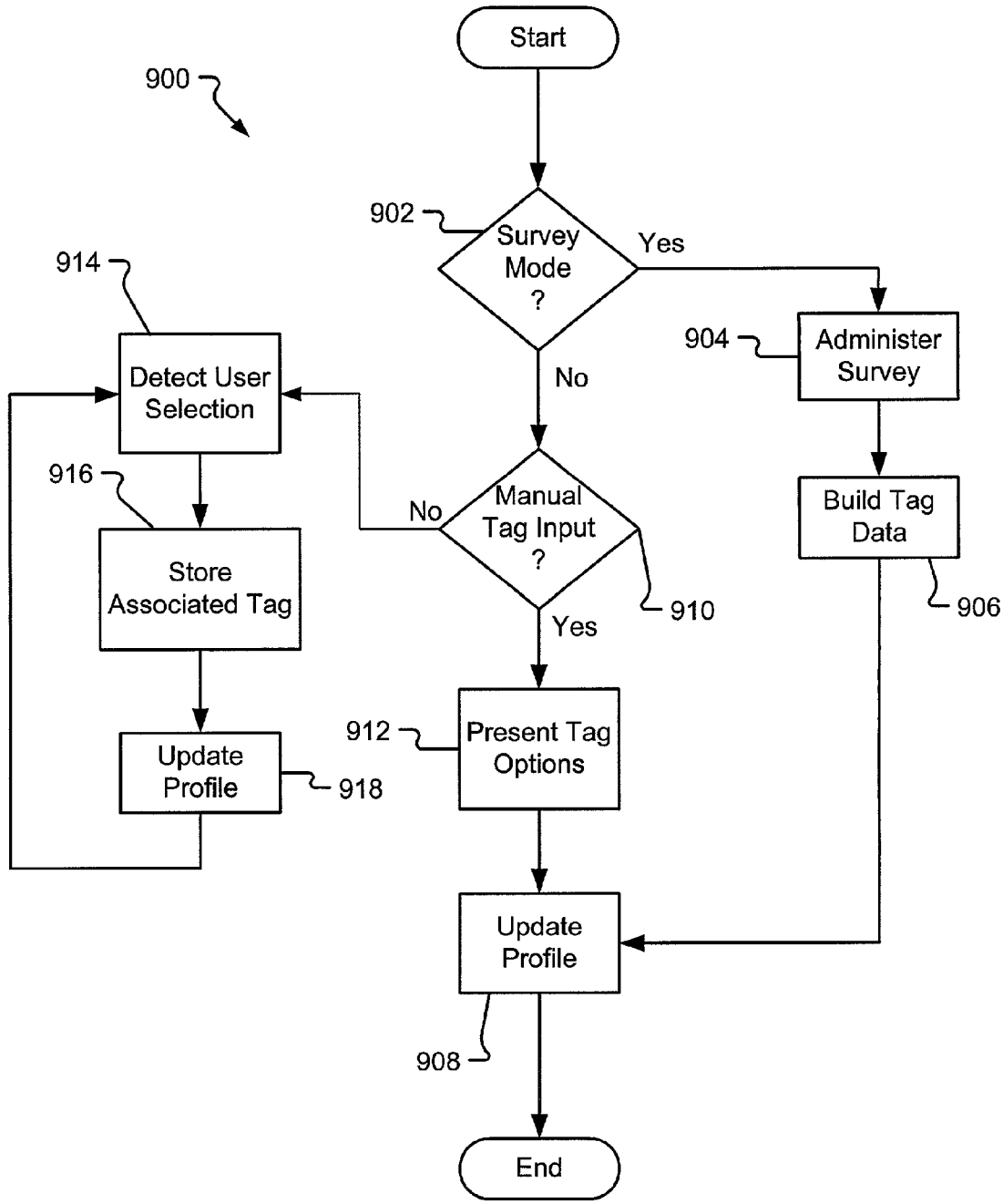
FIG. 9 is a flow diagram illustrating exemplary operations that may be employed by a profile generator for maintaining a user profile, such as the profile shown in FIG. 4.

FIG. 9 describes one exemplary process for establishing the user profile 322. However, it is to be understood that in other embodiments, content may be targeted to all users, or all users in a particular category. This is particularly relevant to broadcast TV in which the head-end of the cable service provider may send content to everyone within a particular zip code. Thus, regardless of the user profile 322, everyone in the zip code would be targeted.

FIG. 9 is a flow diagram 900 illustrating exemplary steps or operations that may be employed by the profile generator 406 for generating and updating the profile 322 to correspond to user preferences. In the embodiment, the user upon initial power-up may be prompted to fill out a survey to provide information about the user to the client device 304. In a querying operation 902, it is determined whether a survey mode has been entered. The survey mode may be entered any number of ways, including a determination that a survey has not yet been filled out, or the user manually selecting a survey mode. If it is determined in the querying operation 902 that the survey mode has been entered, an administering operation 904 administers a survey to the user. During the administering operation 904, the user enters demographic or other data that correspond to the user and his/her preferences for content. Importantly, the data entered by the user in the survey is not released from the client device 304. Rather, the client device 304 uses the survey data to maintain the user profile 322 to provide future content to the user.

Using the demographic data entered during the administering operation 904, a building operation 906 generates tags corresponding to the user's selections in the administering operation 904. As discussed above, the tags have identifier information. The identifier information generated in the building operation 906 associates the user's survey data with categories of common identifiers discussed in FIG. 5. An updating operation 908, updates the profile 322 with tags that were generated in the building operation 906.

If it is determined that the survey mode has not been entered in the querying operation 902, flow branches NO to query operation 910, which determines whether a manual tag input mode has been entered. Querying operation 910, determines whether the user has selected an option for manually entering specific tags associated with media content that the user prefers (or does not prefer) to be presented. If it is determined in the querying operation 910 that a manual tag input mode has been entered, flow branches YES to presenting operation 912 which presents tag options to the user that the user may select. The presenting operation 912 may present tags that have been previously compiled based on tags received from the server device 302, or the presenting operation 912 may access a directory of tags that is periodically updated in the client device 304. After the presenting operation presents tag options to the user, the updating operation 908 updates the user profile 322 with the tags selected by the user in the presenting operation 912.

If, in the querying operation 910, it is determined that the manual tag input mode has not been entered, flow branches NO to detect operation 914 which begins to detect user selections. The detecting operation 914 may detect any selections, such as, but not limited to, mouse clicks, keyboard entry, or remote control data entry. The detecting operation 914 may record the user selections along with other related information such as time of entry, or duration of viewing particular content. For example, in a set-top box implementation, the detecting operation 914 may detect a user selecting a Home Box Office® (HBO®) movie "Band of Brothers"®. The detecting operation 914 records when the user begins watching "Band of Brothers"® as well as when the user changes the channel to another channel, such as a football game on CBS®. The collection, over time, of viewing patterns and preferences builds a user profile indicating the relative interest in different genres of content programming, such as sports, movies, dramas, education, children, etc. Multiple levels of detail (e.g., subtypes) can be derived, such as specific types of sports.

After the detecting operation 914 detects a user selection, a storing operation stores a tag associated with the user selection. As discussed, all media content, including programming, from the server device 302 includes a tag descriptive of the type of content. The tag may be stored for analysis, such as determining a pattern in the user's selections. The user profile 322 is then updated in an updating operation 918. The updating operation 918 involves storing the tags of most viewed content in the user profile 322, preferably in such a way that the tags are quickly accessible. After the user profile 322 is updated by the updating operation 918, operation loops back to the detecting operation 914 wherein subsequent user selections are detected. The detecting operation 914, the storing operation 916, and the updating operation 918 may be iterated indefinitely until the user turns off the client device 304.

Figure 10:
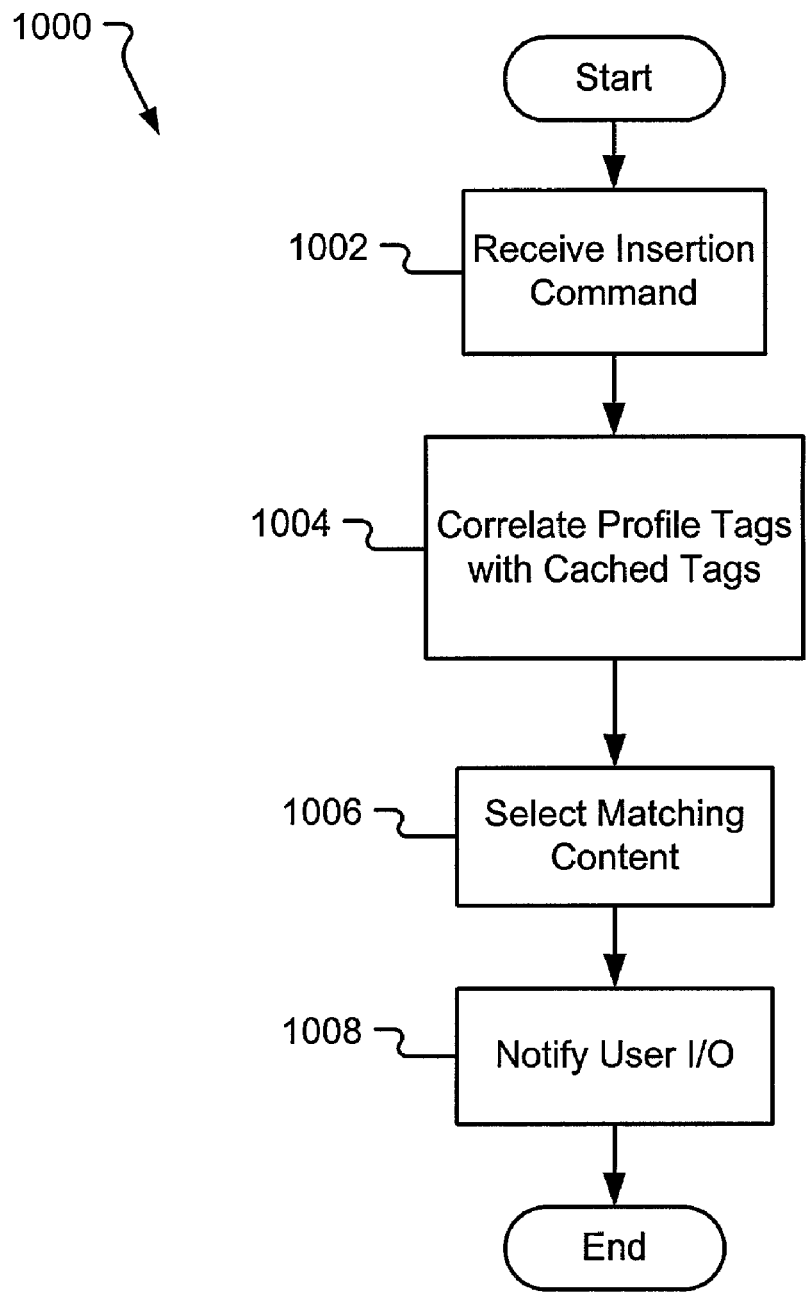
FIG. 10 is a flow diagram illustrating exemplary operations that may be implemented by a filtering module, such as the filtering module shown in FIG. 4.

FIG. 10 is a flow diagram 1000 illustrating exemplary steps or operations that may be implemented by the filtering module 404 to filter out media content received from the server device 302 that is less preferred by the user. A receiving operation 1002 receives a command to insert media content from the content insertion engine 402. A correlating operation 1004 then correlates tags in the user profile 322 with tags from the storage module 314 to determine which tagged data from the storage module is most preferred by the user. In the correlating operation 1004 it is determined whether tags in the storage module 314 are similar to tags in the user profile 322. In one embodiment, the correlating operation 1004 may determine a level of correlation or matching for each data stream in the storage module 314. For example, the correlating operation 1004 may determine that two tags sufficiently match if at least three identifiers in the tags are the same, even if some other identifiers are different between the tags. If the level of matching is above a predetermined threshold, the data stream may be presented to the user.

A selecting operation 1006 then selects the media content that most closely matches the user profile 322. If the insertion command received in the receiving operation 1002 is an ad insertion command, the selecting operation 1006 preferably selects one advertisement from the storage module to be presented to the user. If more than one advertisement sufficiently matches a tag in the user profile 322, the selecting operation 1006 may select an advertisement that has not been presented to the user recently. In a notifying operation 1008 the user I/O module 318 is notified of the media content to be presented to the user that was selected in the selecting operation 1006.

Figure 11:
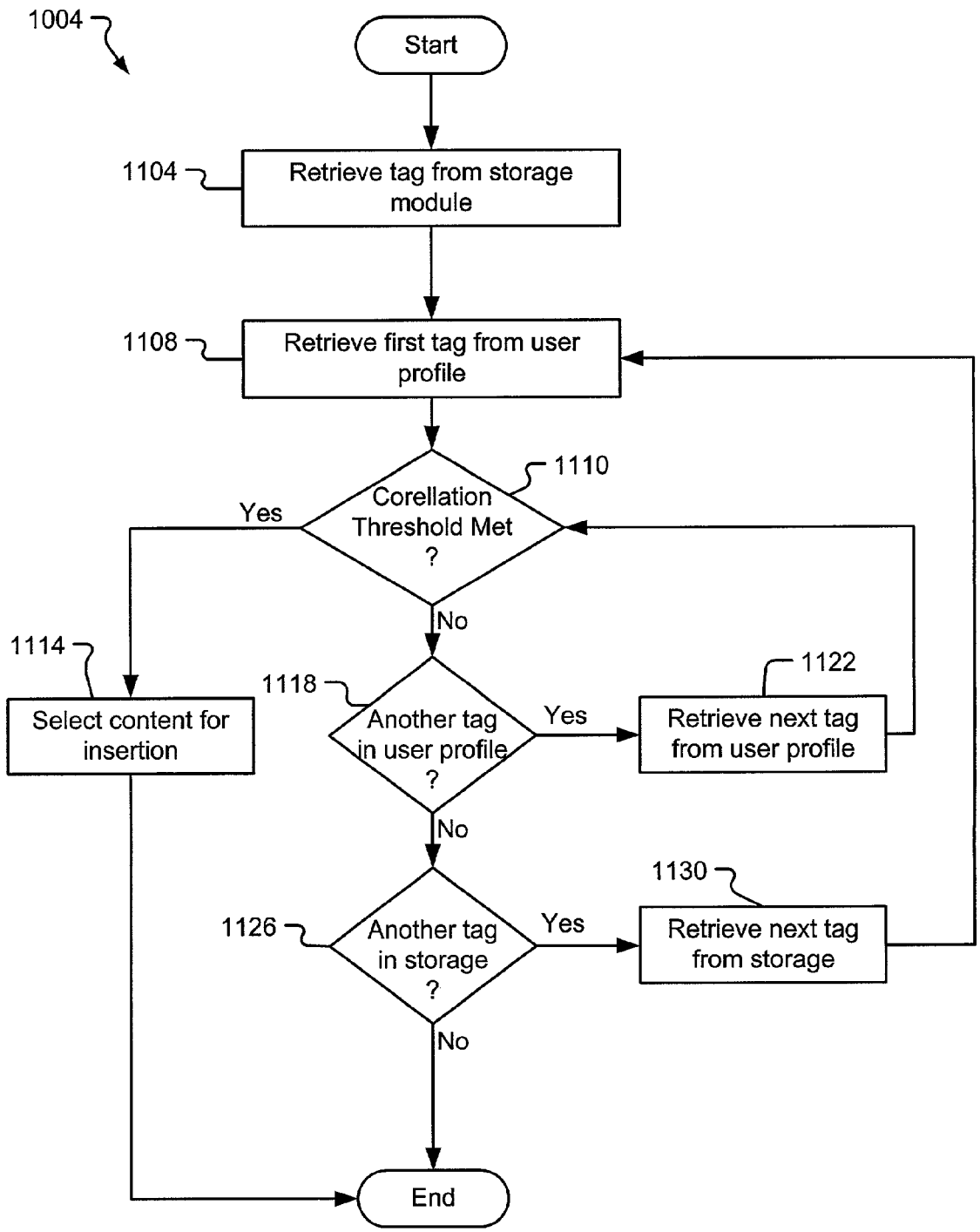
FIG. 11 is a flow diagram illustrating a particular embodiment of correlating, selecting, and notifying operations, such as those shown in FIG. 10.

FIG. 11 illustrates a detailed embodiment of the correlating, selecting, and notifying operations 1004, 1006, and 1008. Upon receipt of an insertion event, the analysis module 320 searches the content in the tagged data memory 316 to determine if content is available that is appropriate for the user of the client device 304. In a retrieving operation 1104, the filter module 404 retrieves a tag from the storage module 314. In this particular embodiment, the storage module 314 reads a tag out of the tagged data memory 316 and keeps track of the order of dispensing tags to the filter module 404. The filter module 404 retrieves a tag out of the user profile 322 in another retrieving operation 1108. In a comparing operation 1110, the filter module 404 compares the tag from the storage module 314 to the tag from the user profile 322 to determine if the two tags meet a predetermined correlation threshold. Comparing the two tags may be accomplished using any method known in the art and depends on how the tags are encoded in the particular implementation. For example, identifiers in the tags may be encoded as single bits (either on or off). In this example, the comparing operation 1110 may perform a bit-masking operation, which is a computationally efficient way of comparing bits.

If it is determined that the two tags retrieved in operations 1104 and 1108 meet the predetermined correlation threshold, the filter module 404 selects the tag retrieved from the storage module 314 in a selecting operation 1114. In the selecting operation 1114, the filter module requests the content associated with the selected tag from the storage module 314 and delivers the content to the user I/O module 318. However, if the two tags compared in the comparing operation 1110 do not meet the predetermined correlation threshold, the filter module 404 determines whether anymore tags exist in the user profile. In a determining operation 1118, the filter module 404 reads the user profile 322 to determine if another tag is available for comparison. If so, the filter module 404 retrieves the next tag from the user profile 322 in a retrieving operation 1122. After the next tag is retrieved from the user profile 322, the comparing operation 1110 compares the next user profile tag with the tag retrieved from the storage module 314.

If, on the other hand, it is determined that no other tags are in the user profile 322, flow branches NO to determine operation 1126. The determining operation 1126 determines whether another tag exists in the tagged data memory 316 for comparison. In the determining operation 1126, the filter module 404 may request another tag from the storage module 314. If no more tags are in the tagged data memory 316, the storage module 314 sends back an error message to the filter module 404. If the storage module 314 identifies another tag in tagged data memory 316, the storage module 314 sends the tag to the filter module 404. The filter module 404 thereby retrieves the next tag in a retrieving operation 1130. After the next tag is retrieved from the storage module 314, operation returns to the retrieving operation 1108 wherein the first tag in the user profile is again retrieved, and the sequence of comparison and retrieval begins again.

If it is determined that no more tags are available in the tagged data memory 316 in the determining operation 1126, or after appropriate content is selected in the selecting operation 1114, the correlating operation 1004 ends. If the correlating operation 1004 ends without any tags in the tagged data memory 316 meeting the correlation threshold, an error message may be sent to the user I/O module 318. The user I/O module 318 can either display a message that content is not available, or the user I/O module 318 can display predetermined default content.

Figure 12:
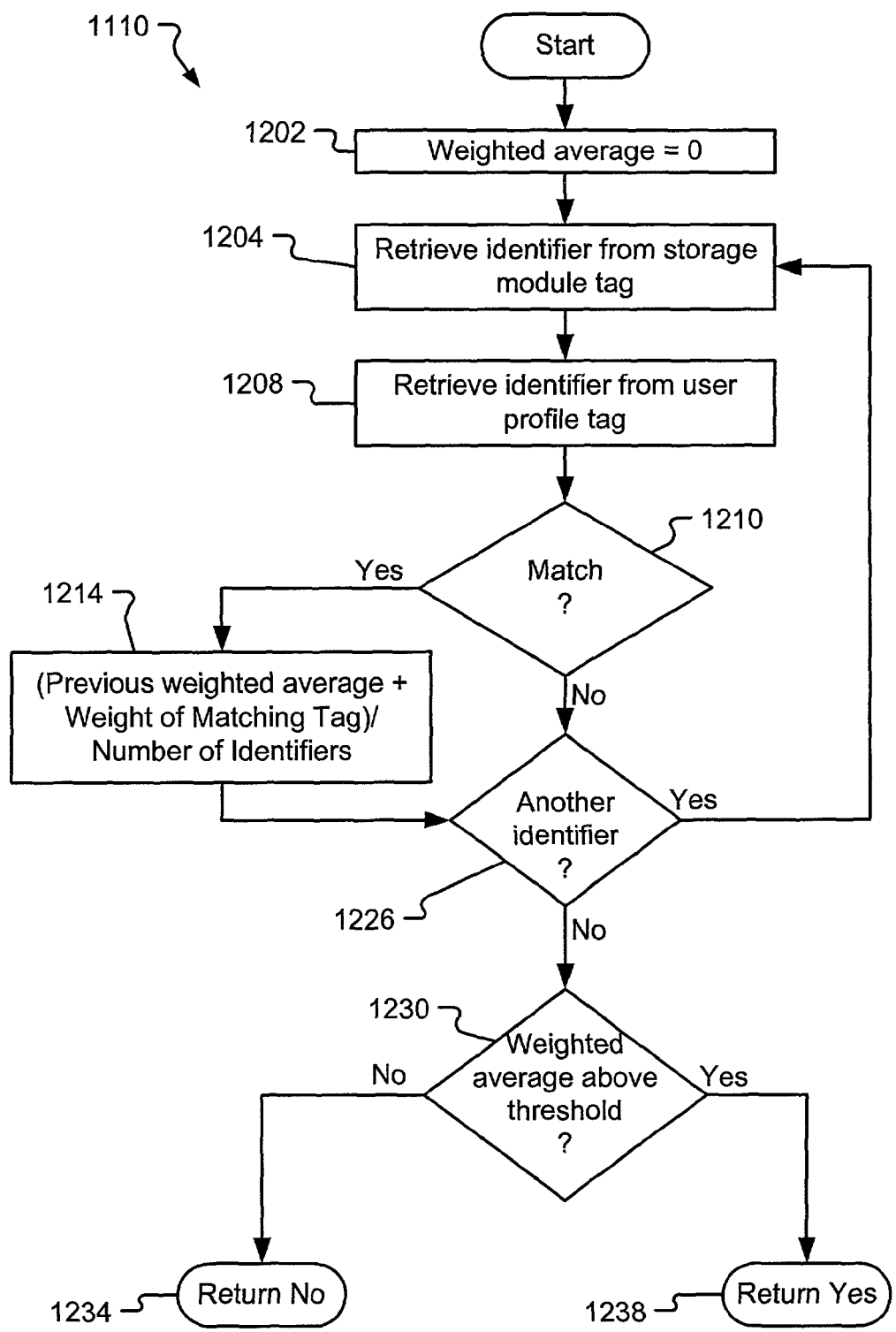
FIG. 12 is a flow diagram illustrating an exemplary process of scoring or correlating tags in accordance with an embodiment of the present invention.

FIG. 12 is a flow diagram illustrating an exemplary operations that may be employed in the comparing operation 1110 of FIG. 11. Input to the operation is a tag from the tagged content memory 316 and a tag from the user profile 322. In general, the operational flow of FIG. 12 iterates through identifiers in the tag from the tagged data memory 316 and associated identifiers in the tag from the user profile 322, determining if the identifying data for the tags matches. After all the identifiers are iterated through, a score is generated that may be used to filter the tag and/or rank the tag in terms of user preference and/or filter the content. In an initializing operation 1202, a weighted average value is set equal to zero. The weighted average value is used to keep track of the score associated with the tag.

In a retrieving operation 1204, an identifier (e.g., type identifier 516 of FIG. 5) and its identifying data (e.g., "Game") is retrieved from the tag from the tagged data memory 316. In another retrieving operation 1208, an associated type identifier and its identifying data are retrieved from the user profile tag. In a comparing operation 1210 it is determined whether the identifying data for the two associated identifiers match. For example, if the type identifying data is "Game" in both the tags, the identifiers match. When the identifier data matches, a scoring operation 1214 accumulates a running score associated with the tag from the tagged data memory 316. In one embodiment, the scoring operation 1214 involves calculating a weighted average of the identifiers. If, in the comparing operation 1210, the identifier data of the tagged data memory tag does not match that of the user profile tag, and after the scoring operation 1214, a determining operation 1226 determines if another identifier remains in the tags to be compared.

If another identifier (e.g., title identifier 518 of FIG. 5) remains for comparison, the retrieving operation 1204 retrieves the identifier and its identifying data from the tagged data memory tag. Processing continues as before to compare the corresponding identifier data of the user profile tag. If no more identifiers remain to be processed in the determining operation 1226, another determining operation 1230 determines if the score computed in the scoring operation 1214 is above a predetermined threshold value. If the score is not above the predetermined threshold value, a return no operation 1234 returns an indicator that the tag from the tagged data memory 316 is not sufficiently correlated to the user profile tag. If the score is above the predetermined threshold value, a return yes operation 1238 returns an indication that the tag from the tagged data memory 316 is sufficiently correlated to the user profile tag. In both the return operations 1234 and 1238, the score may be returned along with the indicator. The score may be used by the calling module to sort tagged data memory tags according to preference.

The method steps illustrated in FIGS. 7-12 may be implemented in firmware in the disc drive or in a computer connected to a disc drive. Additionally, the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

What is claimed is:

1. A method of targeting content, comprising:
    receiving a data stream at a set-top box with the data stream comprising a content item and a content tag;
    storing the data stream in memory of the set-top box;
    detecting an insertion event;
    retrieving multiple identifiers of the content tag from the memory;
    retrieving the multiple identifiers of a corresponding profile tag from a user profile;
    setting an initial value of a score to zero;
    successively comparing each identifier of the content tag to each corresponding identifier of the profile tag;
    determining the content tag matches the profile tag when at least three identifiers of the multiple identifiers match;
    incrementing the score when the match occurs;
    when the content tag does not match the profile tag, then:
    retrieving another profile tag from the user profile and successively comparing each identifier of the content tag to each corresponding identifier of the another profile tag;
    when the user profile contains no more profile tags, then retrieving the multiple identifiers of another content tag from the memory and successively comparing each identifier of the another content tag to each corresponding identifier of the profile tag;
    determining the another content tag matches the profile tag and incrementing the score when the match occurs;
    comparing the score to a threshold value; and
    when the score satisfies the threshold score, then determining that the content item is appropriate for presentation.

2. The method of claim 1, further comprising defining the user profile based on usage.

3. The method of claim 1, further comprising defining the user profile based on manual input.

4. The method of claim 1, further comprising detecting a pattern in user selections and updating the user profile with the pattern.

5. The method of claim 1, further comprising calculating a weighted average of the multiple identifiers in the content tag and the corresponding multiple identifiers in the corresponding profile tag.

6. The method of claim 1, further comprising filtering out unselected data streams.

7. The method of claim 1, further comprising determining that the content item is inappropriate for presentation when the score is less than the threshold score.

8. The method of claim 1, wherein receiving the data stream comprises receiving a classification.

9. The method of claim 1, further comprising causing presentation of the content item.

10. A system for targeting content, comprising:
    a processor executing code stored in memory that causes the processor to:
    receive a data stream comprising a content item and a content tag;
    store the data stream in the memory;
    detect an insertion event;
    retrieve multiple identifiers of the content tag from the memory;
    retrieve the multiple identifiers of a corresponding profile tag from a user profile;
    set an initial value of a score to zero;
    successively compare each identifier of the content tag to each corresponding identifier of the profile tag;
    determine the content tag matches the profile tag when at least three identifiers of the multiple identifiers match;
    increment the score when the match occurs;
    when the content tag does not match the profile tag, then:
    retrieve another profile tag from the user profile and successively compare each identifier of the content tag to each corresponding identifier of the another profile tag;
    when the user profile contains no more profile tags, then retrieve the multiple identifiers of another content tag from the memory and successively compare each identifier of the another content tag to each corresponding identifier of the profile tag;

determine the another content tag matches the profile tag and increment the score when the match occurs;

compare the score to a threshold value; and when the score satisfies the threshold score, then determine that the content item is appropriate for presentation.

11. The system of claim 10, wherein the code further causes the processor to define the user profile based on usage.

12. The system of claim 10, wherein the code further causes the processor to define the user profile based on manual input.

13. The system of claim 10, wherein the code further causes the processor to detect a pattern in user selections and update the user profile with the pattern.

14. The system of claim 10, wherein the code further causes the processor to calculate a weighted average of the content tag.

15. The system of claim 10, wherein the code further causes the processor to report an error when the score fails the threshold value.

16. The system of claim 10, wherein the code further causes the processor to receive a classification associated with the content item.

17. The system of claim 10, wherein the code further causes the processor to cause presentation of the content item.

18. A computer readable storage medium storing processor executable instructions for performing a method of targeting content, the method comprising:

receiving a data stream comprising a content item and a content tag;

storing the data stream in the memory;

detecting an insertion event;

retrieving multiple identifiers of the content tag from the memory;

retrieving the multiple identifiers of a corresponding profile tag from a user profile;

setting an initial value of a score to zero;

successively comparing each identifier of the content tag to each corresponding identifier of the profile tag;

determining the content tag matches the profile tag when at least three identifiers of the multiple identifiers match;

incrementing the score when the match occurs;

when the content tag does not match the profile tag, then:

retrieving another profile tag from the user profile and successively comparing each identifier of the content tag to each corresponding identifier of the another profile tag;

when the user profile contains no more profile tags, then retrieving the multiple identifiers of another content tag from the memory and successively comparing each identifier of the another content tag to each corresponding identifier of the profile tag;

determining the another content tag matches the profile tag and incrementing the score when the match occurs;

comparing the score to a threshold value; and when the score satisfies the threshold score, then determining that the content item is appropriate for presentation.

* * * * *